United States Patent
Seth

(10) Patent No.: US 11,138,496 B2
(45) Date of Patent: Oct. 5, 2021

(54) PARALLEL NEURAL PROCESSOR FOR ARTIFICIAL INTELLIGENCE

(71) Applicant: Rohit Seth, Ontario (CA)

(72) Inventor: Rohit Seth, Ontario (CA)

( * ) Notice: Subject to any disclaimer, the term of this patent is extended or adjusted under 35 U.S.C. 154(b) by 84 days.

(21) Appl. No.: 16/145,077

(22) Filed: Sep. 27, 2018

(65) Prior Publication Data

US 2019/0080228 A1    Mar. 14, 2019

Related U.S. Application Data

(63) Continuation of application No. 16/124,104, filed on Sep. 6, 2018.

(60) Provisional application No. 62/556,312, filed on Sep. 8, 2017.

(51) Int. Cl.
  *G06N 3/063*  (2006.01)
  *G06K 9/62*   (2006.01)
  *G06N 3/04*   (2006.01)
  *G06F 9/46*   (2006.01)
  *G06N 3/08*   (2006.01)

(52) U.S. Cl.
  CPC .............. *G06N 3/063* (2013.01); *G06F 9/46* (2013.01); *G06K 9/6267* (2013.01); *G06K 9/6271* (2013.01); *G06K 9/6282* (2013.01); *G06N 3/0454* (2013.01); *G06N 3/0472* (2013.01)

(58) Field of Classification Search
  None
  See application file for complete search history.

(56) References Cited

U.S. PATENT DOCUMENTS

| | | | | |
|---|---|---|---|---|
| 4,481,463 A | * | 11/1984 | Ferrieu | H04M 19/005 323/315 |
| 5,167,008 A | * | 11/1992 | Engeler | G06N 3/063 706/43 |
| 5,253,328 A | * | 10/1993 | Hartman | G06F 11/1064 706/25 |
| 9,195,934 B1 | | 11/2015 | Hunt et al. | |
| 2007/0011118 A1 | | 1/2007 | Snook et al. | |
| 2008/0319933 A1 | | 12/2008 | Moussa et al. | |

(Continued)

OTHER PUBLICATIONS

Graves, A. et al., "Hybrid computing using a neural network with dynamic external memory," Nature vol. 538 (Oct. 27, 2016) pp. 471-476. (Year: 2016).*

(Continued)

*Primary Examiner* — Brian M Smith
(74) *Attorney, Agent, or Firm* — Morgan, Lewis & Bockius LLP

(57) ABSTRACT

Systems and/or devices for efficient and intuitive methods for implementing artificial neural networks specifically designed for parallel AI processing are provided herein. In various implementations, the disclosed systems, devices, and methods complement or replace conventional systems, devices, and methods for parallel neural processing that (a) greatly reduce neural processing time necessary to process more complex problem sets; (b) implement neuroplasticity necessary for self-learning; and (c) introduce the concept and application of implicit memory, in addition to explicit memory, necessary to imbue an element of intuition. With these properties, implementations of the disclosed invention make it possible to emulate human consciousness or awareness.

22 Claims, 16 Drawing Sheets

(56) References Cited

U.S. PATENT DOCUMENTS

| | | | |
|---|---|---|---|
| 2011/0068963 A1* | 3/2011 | Kehl | H03M 1/1076 |
| | | | 341/144 |
| 2014/0032457 A1 | 1/2014 | Palmer et al. | |
| 2015/0248607 A1 | 9/2015 | Sarah et al. | |
| 2015/0254553 A1* | 9/2015 | Arsovski | G06N 3/08 |
| | | | 706/25 |
| 2018/0157968 A1* | 6/2018 | Henry | G06N 3/0445 |
| 2018/0300631 A1* | 10/2018 | Roy | G06N 3/088 |

OTHER PUBLICATIONS

Kohonen, T., "Essentials of the self-organizing map," Neural Networks, vol. 37 (2013) pp. 52-65. (Year: 2013).*
Seth, International Search Report and Written Opinion, PCT/IB2018/000994, dated Jan. 24, 2019, 8 pgs.
Seth, International Preliminary Reporton Patentability, PCT/IB2018/000994, dated Mar. 10, 2020, 6 pgs.

* cited by examiner

PARALLEL NEURAL PROCESSOR FOR ARTIFICIAL INTELLIGENCE

CROSS-REFERENCE TO RELATED APPLICATIONS

This U.S. application is a continuation of U.S. Ser. No. 16/124,104, filed Sep. 6, 2018, entitled "Parallel Neural Processor for Artificial Intelligence," which claims the benefit of U.S. Provisional Patent Application No. 62/556,312 filed Sep. 8, 2017 entitled "Parallel Neural Processor for Artificial Intelligence", both of which are incorporated by reference herein in their entirety.

TECHNICAL FIELD

The disclosed implementations relate generally to Artificial Intelligence and more specifically to a method, system, and device for implementing a parallel neural processor for Artificial Intelligence.

BACKGROUND

Artificial Intelligence (AI) applications have been traditionally designed for and as software-driven systems. In such systems, processing elements (acting as "neurons" in an AI "brain") are programmed to occupy fixed states in hardware memory. The neurons are interconnected by representative values of coupling variables to form an artificial neural network. The states of these neurons are iteratively evaluated using activation functions that process weights, biases, and input data to produce binary output values (i.e. a 0 or a 1). The resultant state of a neuron is stored as an output state of the neuron in memory, and subsequently used as an input for a connected neuron in the artificial neural network. At a high level, input and output states of several neurons are evaluated in an iterative fashion. Some systems use multi-threading and multi-core processors for simultaneously evaluating several blocks of neurons, but the system as a whole remains "serial" in nature. Larger neural networks are capable of solving more complex and a greater variety of problems than smaller networks. But larger neural networks require microprocessors with larger core counts and/or larger number of threads. AI applications are thus limited by the speed of these conventional processors.

To compensate for the limits of traditional hardware, AI systems are designed cleverly with various shortcuts and boundary conditions, and tuned for particular problem sets. Since the boundary conditions are predefined, these systems are limited to highly specific applications. For example, an AI system that is trained to recognize human faces may not be effective in recognizing a giraffe's face.

Conventional systems incur large overhead, fail to achieve rapid response to complex problem sets in a cost-effective manner, and are far from being able to achieve artificial consciousness.

SUMMARY

Accordingly, there is a need for systems and/or devices with more efficient and intuitive methods for implementing artificial neural networks specifically designed for parallel AI processing. In some implementations, the disclosed systems, devices, and methods complement or replace conventional systems, devices, and methods for parallel neural processing that (a) greatly reduce neural processing time necessary to process more complex problem sets; (b) implement neuroplasticity necessary for self-learning; and (c) introduce the concept and application of implicit memory, in addition to explicit memory, necessary to imbue an element of intuition. With these properties, some implementations of the disclosed invention make it possible to emulate human consciousness or awareness.

(A1) In one aspect, some implementations include a first sub-classifier configured to process an input signal. The first sub-classifier comprises a weighted input module that is configured to apply a weighting to the input signal to generate a weighted input signal. The first sub-classifier also comprises a comparison module coupled to the weighted input module. The comparison module is configured to: receive the weighted input signal at a comparison module input line; and generate a first output signal at a comparison module output line. The comparison module is further configured to: determine whether the weighted input signal has a value that is between a lower window range value and an upper window range value. In response to a determination that the weighted input signal has a value between the lower window range value and the upper window range value, the comparison module is configured to: set the first output signal to have a first value at the comparison module output line. In response to a determination that the weighted input signal has a value that is not between the lower window range value and the upper window range value, the comparison module is configured to: set the first output signal to have a second value different from the first value at the comparison module output line.

(A2) In some implementations of the first sub-classifier of A1, the comparison module includes at least one operational amplifier configured to receive the weighted input signal and set the first output signal.

(A3) In some implementations of the first sub-classifier of A1, the weighting applied to the input signal to generate the weighted input signal is based on a second output signal from a second sub-classifier.

(A4) In some implementations of the first sub-classifier of A1, the first output signal from the first sub-classifier is transmitted to a second sub-classifier.

(A5) In some implementations of the first sub-classifier of A4, the weighted input module is configured to receive a control group signal and apply the weighting to the input signal to generate the weighted input signal based on the control group signal.

(A6) In some implementations of the first sub-classifier of A5, the weighted input module includes a variable resistor configured to receive the control group signal and adjust the weighted input signal based on the control group signal.

(A7) In some implementations of the first sub-classifier of A1, the first sub-classifier further comprises a memory module configured to receive and store the first output signal from the comparison module and provide the first output signal to a second sub-classifier.

(A8) In another aspect, some implementations include a classifier system configured to process one or more input signals during one or more clock cycles. The classifier system comprises a plurality of sub-classifiers. Each of the plurality of sub-classifiers includes a weighted input module configured to apply a weighting to a respective input signal for a respective clock cycle to generate a weighted input signal. Each of the plurality of sub-classifiers also includes a comparison module coupled to the weighted input module. The comparison module is configured to receive the weighted input signal at a comparison module input line, and generate an output signal at a comparison module output line. The comparison module is further configured to determine whether the weighted input signal has a value that is between a lower window range value and an upper window range value. The comparison module is further configured to, in response to a determination that the weighted input signal has a value between the lower window range value and the upper window range value, set a first output signal to have a value greater than a predetermined output threshold at the comparison module output line. The comparison module is further configured to, in response to a determination that the weighted input signal has a value that is not between the lower window range value and the upper window range value, set the first output signal to have a value less than the predetermined output threshold at the comparison module output line. The classifier system also comprises a master classifier coupled to the plurality of sub-classifiers. The master classifier is configured to receive each of the respective output signals from each of the plurality of sub-classifiers during the one or more clock cycles, and determine a classifier response based on the subset of the plurality of sub-classifiers that produce a respective output signal having a value greater than the predetermined output threshold.

(A9) In some implementations of the classifier system of (A8), each of the sub-classifiers has a respective window range between the lower window range value and the upper window range value that does not overlap with any other respective window range of any other sub-classifier.

(A10) In some implementations of the classifier system of (A8), the classifier system further comprises a multiplexer coupled to the plurality of sub-classifiers, the multiplexer configured to provide one of the input signals to the plurality of sub-classifiers during a single clock cycle.

(A11) In another aspect, some implementations include a method to process an input signal using a first sub-classifier. The first sub-classifier includes a weighted input module and a comparison module coupled to the weighted input module. The method includes applying, at the weighted input module, a weighting to the input signal to generate a weighted input signal. The method further includes receiving, at the comparison module, the weighted input signal at a comparison module input line. The method further includes generating, at the comparison module, a first output signal at a comparison module output line by an electrical process. The electrical process can be nationalized as a sequence of steps that include determining, at the comparison module, whether the weighted input signal has a value that is between a lower window range value and an upper window range value. The sequence of steps further includes in response to a determination that the weighted input signal has a value between the lower window range value and the upper window range value, setting, at the comparison module, the first output signal to have a first value at the comparison module output line. The sequence of steps further includes in response to a determination that the weighted input signal has a value that is not between the lower window range value and the upper window range value, setting, at the comparison module, the first output signal to have a second value different from the first value at the comparison module output line.

(A12) In some implementations of the method of (A11), the comparison module includes at least one operational amplifier module, and the method further includes receiving, at the at least one operational amplifier module, the weighted input signal and setting, at the at least one operational amplifier module, the first output signal.

(A13) In some implementations of the method of (A11), the method further includes receiving, at the weighted input module, a second output signal from a second sub-classifier.

(A14) In some implementations of the method of (A11), the method further includes transmitting the first output signal from the first sub-classifier to a second sub-classifier.

(A15) In some implementations of the method of (A14), the method further includes receiving, at the weighted input module, a control group signal, and applying, at the weighted input module, the weighting to the input signal to generate the weighted input signal based on the control group signal.

(A16) In some implementations of the method of (A15), the weighted input module includes a current flow or voltage controller (variable resistor module, resistor ladder, resistor network, or a circuit to control current flow) and the method further includes receiving, at the variable resistor module, the control group signal and adjust the weighted input signal based on the control group signal.

(A17) In some implementations of the method of (A13), the first sub-classifier includes a memory module coupled to the comparison module, and the method further includes receiving and storing, at the memory module, the first output signal from the comparison module and provide the first output signal to a second sub-classifier.

(A18) In yet another aspect, some implementations include a method to process one or more input signals during one or more clock cycles using a classifier system. The classifier system includes a plurality of sub-classifiers and a master classifier coupled to the plurality of sub-classifiers, the plurality of sub-classifiers each including a weighted input module and a comparison module. The method includes at each sub-classifier applying, at the weighted input module, a weighting to a respective input signal for a respective clock cycle to generate a weighted input signal; receiving, at the comparison module, the weighted input signal at a comparison module input line; and generating, at the comparison module, an output signal at a comparison module output line by an electrical process. The process can be nationalized as a sequence of steps that include determining, at the comparison module, whether the weighted input signal has a value that is between a lower window range value and an upper window range value. The sequence of steps further includes in response to a determination that the weighted input signal has a value between the lower window range value and the upper window range value, setting, at the comparison module, an output signal to have a value greater than a predetermined output threshold at the comparison module output line. The sequence of steps further includes in response to a determination that the weighted input signal has a value that is not between the lower window range value and the upper window range value, setting, at the comparison module, the output signal to have a value less than the predetermined output threshold at the comparison module output line. The method further includes at the master classifier: receiving each of the output signals from each of the plurality of sub-classifiers during the one or more clock cycles, and determining a classifier response based on the subset of the plurality of sub-classifiers that produce a respective output signal having a value greater than the predetermined output threshold.

(A19) In some implementations of the method of (A18), each of the sub-classifiers has a respective window range between the lower window range value and the upper window range value that does not overlap with any other respective window range of any other sub-classifier.

(A20) In some implementations of the method of (A18), the classifier system includes a multiplexer module coupled to the plurality of sub-classifiers, and the method further includes providing, at the multiplexer module, one of the input signals to the plurality of sub-classifiers during a single clock cycle.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not necessarily the same electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1A:
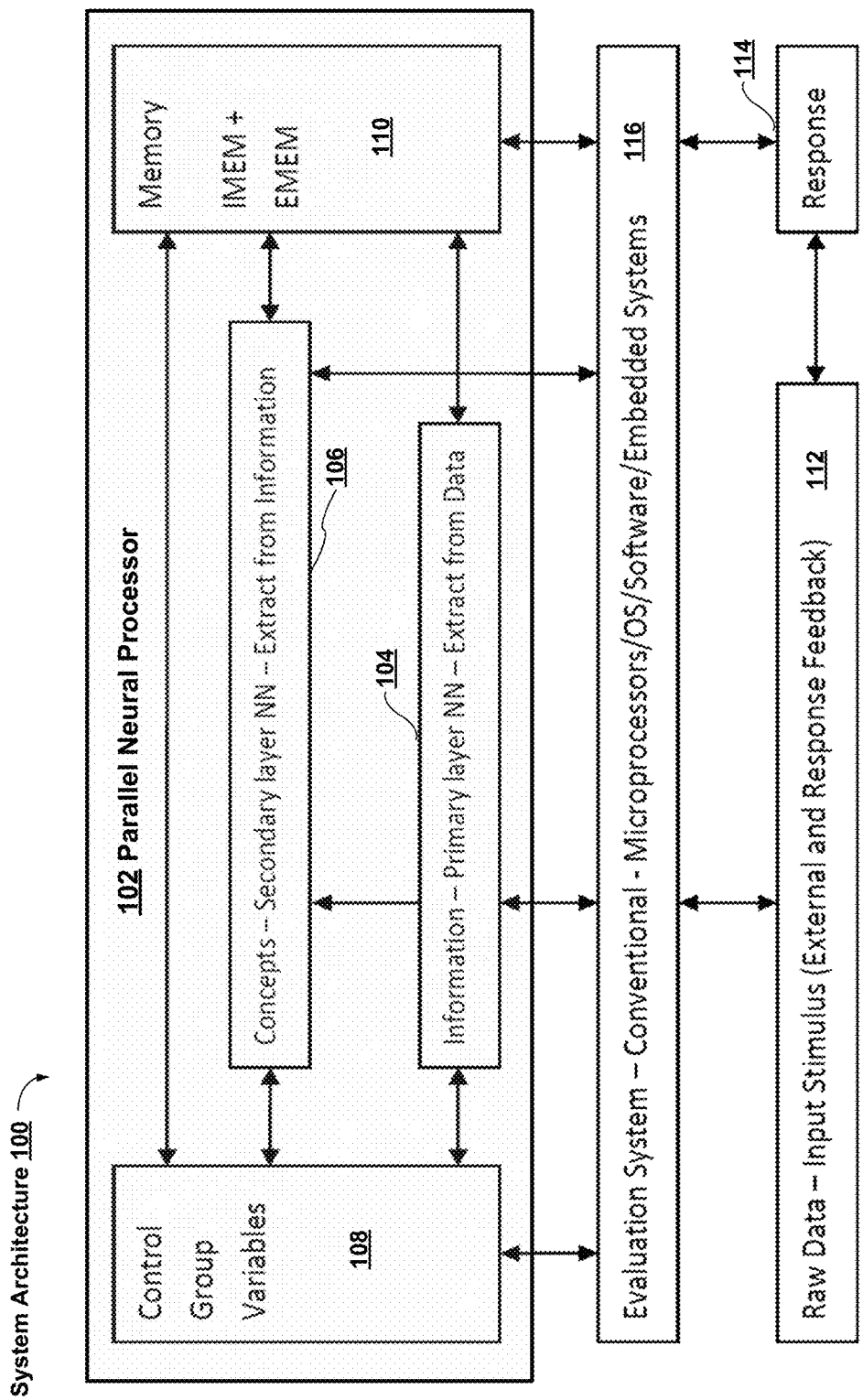
FIGS. 1A and 1B are block diagrams illustrating example system architectures with a parallel neural processing (PNP) AI processor, according to some implementations.
Figure 1B:
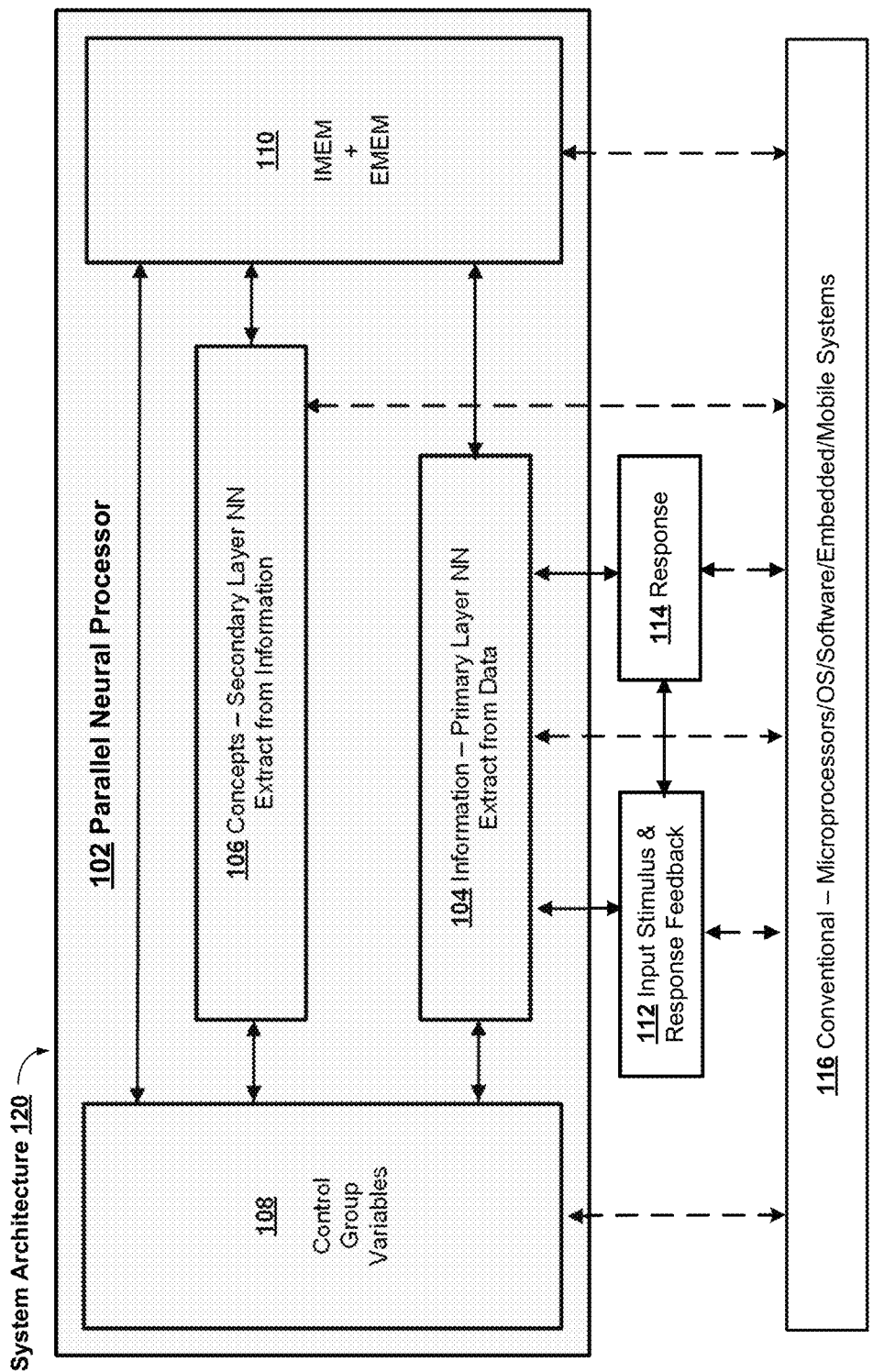

FIGS. 1A and 1B are block diagrams illustrating example system architectures with a parallel neural processing (PNP) AI processor, according to some implementations. FIG. 1A is a block diagram illustrating an example system architecture 100 that integrates a PNP AI processor 102 with an evaluation system 116 that processes raw data, transmits AI tasks (e.g., image recognition, natural language processing) to the PNP AI processor 102, and evaluates the output of the PNP AI processor 102, according to some implementations. Evaluation system 116 transmits AI tasks to the PNP AI processor 102 permitting the system to react quickly to external stimuli 112 with meaningful responses 114. In this configuration, the PNP AI processor 102 serves as a co-processor, executing critical tasks received from evaluation system 116. In some implementations, the evaluation system 116 comprises conventional microprocessors, software, embedded, or mobile applications. FIG. 1B is a block diagram illustrating an example system architecture 120 in which the PNP AI processor 102 operates independently (without the assistance of evaluation system 116 of FIG. 1A) in response to the input stimulus 112, processes the input stimulus 112 and generates responses 114. In this configuration, as the dashed lines indicate, the PNP AI processor 102 can also operate in conjunction with a conventional system comprising of existing microprocessors, software, embedded, or mobile applications.

When the PNP AI processor 102 acts as a co-processor, as shown in FIG. 1A, the evaluation system 116 (sometimes herein called the processor sub-system) is responsible for pre-processing raw data input (sometimes herein called stimulus) from external input devices and sending the raw data input to the PNP AI processor 102, according to some implementations. For example, the processor sub-system converts input data into representative voltage levels input to the PNP AI processor. In various implementations, such stimulus include data entered by the user (e.g., a keyboard or a mouse), an image or video input from an external device (e.g., a camera), an audio input, sensory data from sensors and/or motors. This list is exemplary and not intended to be exhaustive. As an illustration, when a movable robotic arm controlled by the system architecture 100 is stuck due to an external physical constraint (e.g., blocked by a wall), one or more sensors in the robotic arm can generate feedback to the system that affects the control group (CG) module 108 (described below in detail with reference to FIG. 6).

Evaluation system 116 shown in FIG. 1A, implements an interactive intelligence system in combination with a PNP AI Processor, according to some implementations. In some implementations, the evaluation system evaluates action options received from the PNP AI processor 102 (sometimes herein referred to as a classifier, or classifier system) in response to a stimulus, against a stored set of experiences, according to some implementations. In some implementations, the evaluation system 116 classifies the probability of success of the action options based on the stored set of experiences and returns the highest ranking action (i.e., the action with the highest probability of success). Subsequently, in some implementations, the evaluation system 116 generates an action response (e.g., starts a motor that moves a robotic arm) corresponding to the highest ranking (stimulated, implicit, reflex) action. In some implementations, the evaluation system 116 compares experience data stored in EMEM of memory 110 with data stored in IMEM of memory 110, and generates an action if there is a match between the two data (evaluated, explicit, cognitive). In some such implementations, if the explicit and the implicit responses mismatch, the evaluation system adjusts (neuroplasticity) one or more factors or variables in the CG module 108 (described below with reference to FIG. 5). As explained below in further detail, the factors or variable from the CG module 108 impact the number of neurons utilized during a processing clock cycle as well as the learning rate of the neurons. Further, in some implementations, if the stimulus led to a successful action, information indicating the successful action is fed back to the PNP AI Processor (e.g., via a feedback signal to the memory block 110 and/or the CG module 108) for further use in subsequent processing steps. In some implementations, the action taken corresponding to the stimulus leads to further stimuli.

Attention is now directed to the PNP AI processor 102. As shown in FIGS. 1A and 1B, in some implementations, the PNP AI processor 102 comprises of one or more layers of neural networks (e.g., an information layer or primary layer of neural network 104 that extracts information from data input or stimulus, and/or a concept layer or secondary layer of neural network 106 that extracts concepts from the information output of the primary layer 104), a control group (CG) module 108, and one or more memory blocks 110 (e.g., implicit memory block IMEM, an explicit memory block EMEM). In some implementations, the CG module 108 and/or the memory blocks 110 are optional components.

Each layer 104, 106 may comprise a plurality of interconnected neurons (also referred to herein as sub-classifiers). In some implementations, the neurons are connected based on a topology that is configurable. The neurons (explained in detail below with reference to FIGS. 2-6) are the processing elements or engines of a neural network. Similar to how software neurons operate in an artificial neural network, hardware neurons in the parallel neural processor 102 also process and classify data. However, unlike software neurons, the hardware neurons operate in parallel, sometimes in sets of millions, billions, or even trillions at a time. In some implementations, the network of neurons in a layer is organized in stages, with each set of neurons in a stage operating in parallel during a given clock cycle. For example, a first stage of neurons operates on an input, followed by one or more stages of neurons (sometimes called hidden layers) processing the output of the first stage of neurons in succession, and finally feeding into an output stage of neurons. Each stage takes one clock cycle to complete with all the neurons in a stage operating on the same input, according to some implementations. Thus, these implementations achieve faster processing rates as compared to fully software-implemented systems. For the input stage, hardware (e.g., a multiplexer) that is either external or internal to the neural processor supplies or distributes the raw data across the neural network, according to some implementations. In some implementations, evaluation system 116 pre-processes the raw data (e.g., raw data 112) and feeds the PNP AI preprocessor with processed input (e.g., predetermined voltage levels). Once a network of neuron is trained on a particular data set, different groups of neurons activate for different sets of data, according to some implementations. For example, one set of neurons (with a first winner neuron) activates in response to receiving input data representative of an image of tennis ball, whereas another set of neurons (with a second winner neuron) activates in response to receiving input data representative of an image of a flower.

The control group (CG) module 108 is explained in detail in reference to FIGS. 5 and 6 below, according to some implementations. The memory block 110 is explained in reference to FIG. 6 below. The various internal connections between the modules of the PNP AI processor 102, and the external connections from the PNP AI processor 102 are indicated by solid black lines in FIG. 1A, according to some implementations.

In some implementations, the input stimulus 112 is connected directly to one or more neural networks in the parallel neural processor 102, without the need of an evaluation system 116 to pre-process raw input data. In some implementations, the output of the PNP AI processor 102 is directly connected to the response module 114 without an intervening evaluation system 116. In some implementations, the stimulus receiving module 112 and/or the response module 114 are integrated within the PNP AI processor, i.e., the PNP AI processor 102 can receive stimulus (e.g., some kind of interference) and/or generate response (e.g., move a robotic arm) without external software/hardware.

The circuits described here and below enable parallel hardware implementation of neural networks that employ millions, billions, or even trillions of neurons. Such massively parallel hardware implementations enable AI implementations that address complex problem sets.

In some implementations, various sections of a neural network are organized in a hierarchical manner to produce multi-dimensional layers of neurons that feed into each other in stages. For example, a hierarchical neural network resembles how a network of neurons is organized in the human eye. As another example, a neural network is organized in two layers, with a first layer of neurons data (e.g., layer of neurons 104, FIGS. 1A and 1B) extracting information from the input, and a second layer of neurons data (e.g., layer of neurons 106, FIGS. 1A and 1B) recognizing concepts based on the output of the first layer. In some such implementations, with the ability to extract and retain high-level concepts out of low-level information (e.g., raw data containing patterns), a neural network processes and generates response to new stimuli (i.e., data not previously seen while training). For example, a neural network using the circuits described above can recognize related high-level concepts, such as "hearing is to ears as sight is to eyes (senses)" can be extracted in higher connected layers and applied during new, unrelated and yet un-experienced, stimulus such as taste.

Figure 2A:
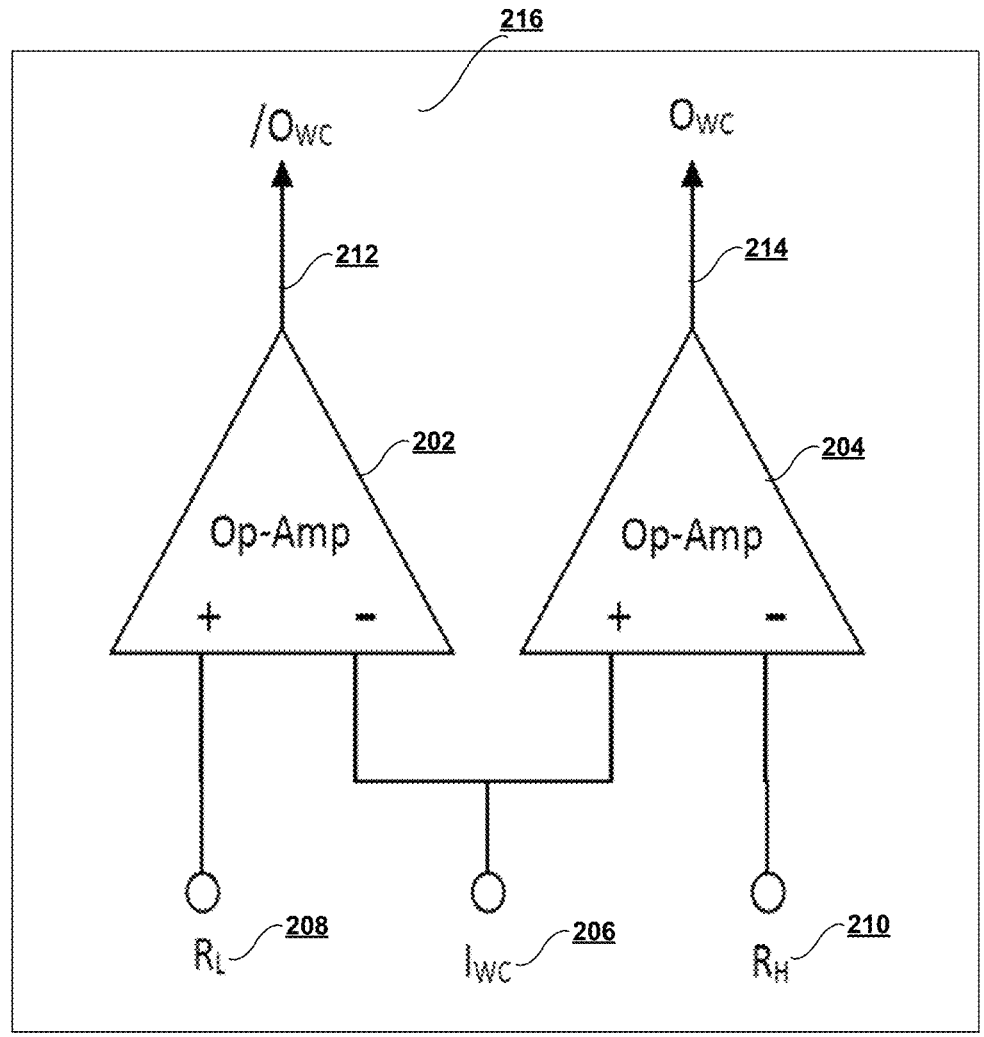
FIG. 2A illustrates an analog window comparator, a component of the PNP AI processor, according to some implementations.

FIG. 2A illustrates an analog window comparator (WC) 216, a component of a sub-classifier, of the PNP AI processor 102 of FIGS. 1A-1B, according to some implementations. In some implementations, unlike conventional neural networks that emulate artificial neurons through the use of microprocessors, random access memory, operating system/embedded system, and software, the system disclosed here is a hardware implementation. A WC circuit (sometimes herein called a comparator) 216, such as the one shown in FIG. 2A, forms the basis of a neuron, according to some implementations. In some implementations, WC circuits are constructed using a variety of basic electronic components (e.g., junction transistors, FETs). In some implementations, WC circuits are constructed using integrated circuits (e.g., Operational Amplifiers). As shown in FIG. 2A, a WC circuit outputs ($O_{WC}$ 214) a high bit (1) if the voltage applied to its input ($I_{WC}$ 206) falls between a Low Reference Voltage ($R_L$ 208) and a High Reference Voltage ($R_H$ 210), and outputs (/$O_{WC}$ 212) a low bit (0) if the input ($I_{WC}$ 206) falls outside the High and Low Reference Voltages reference voltages, according to some implementations. In some implementations, a single WC circuit forms an individual "hardware neuron" which "fires" (or activates) if the input voltage is within a range, producing an all-or-none response similar to the response of a virtual neuron achieved via software applications.

Figure 2B:
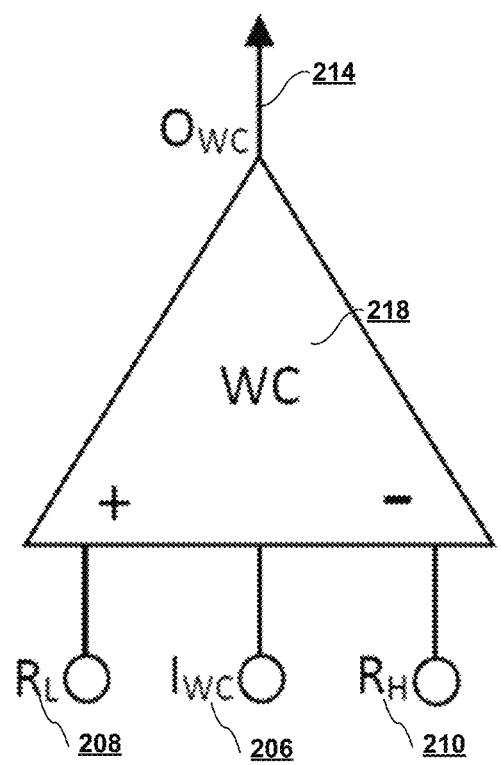
FIG. 2B illustrates a non-inverting window comparator, according to some implementations.

FIG. 2B illustrates a non-inverting WC 218, according to some implementations. In some implementations, WC 218 performs substantially the same functions as the WC circuit 216 in FIG. 2A. In some implementations, WC 218 is formed using two connected operational amplifiers (Op-Amp 202 and Op-Amp 204 of FIG. 2A).

In some implementations, the WC circuits are configured to be inverting or non-inverting with respect to the input condition. For the sake of simplicity, only the non-inverting output ($O_{WC}$ 214) of the WC is shown in FIGS. 2A-2B. The examples discussed herein should be considered as exemplars, rather than limitations.

Figure 3:
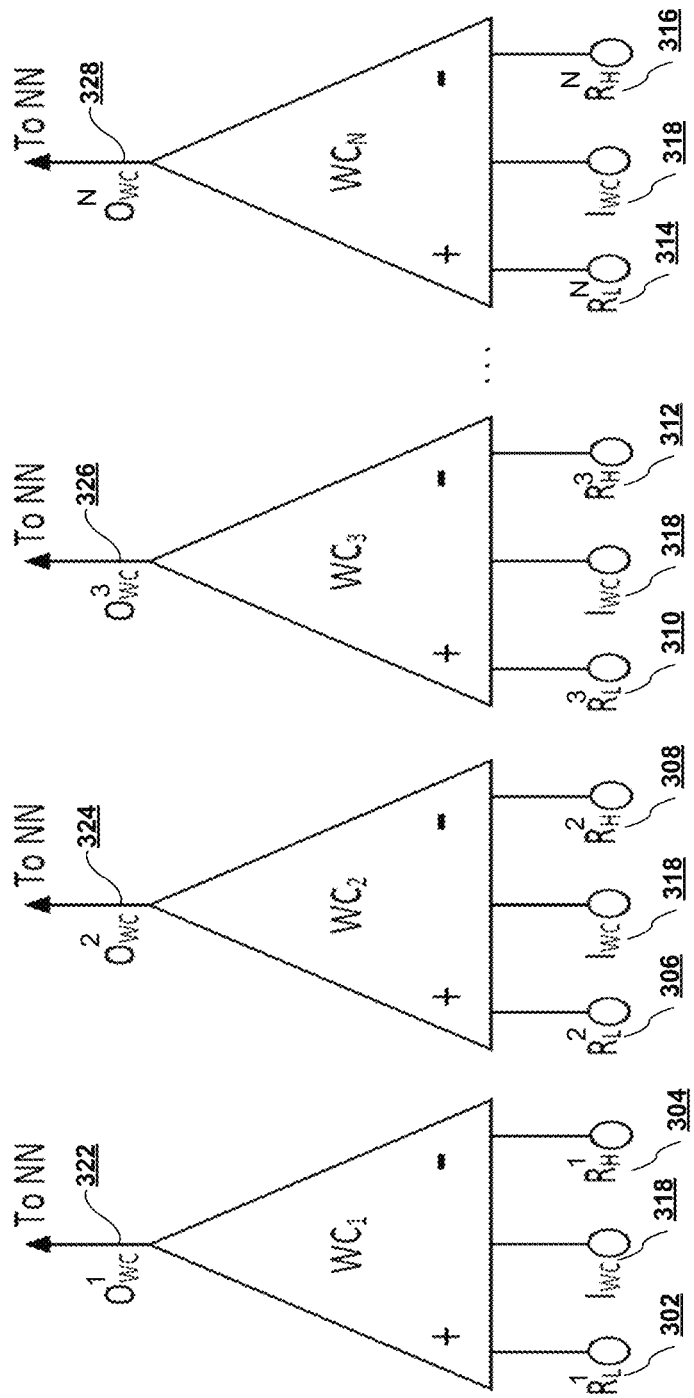
FIG. 3 illustrates a series of window comparator circuits in a neural network, according to some implementations.

FIG. 3 illustrates a series of WC circuits ($WC_1$, $WC_2$, $WC_3$, ..., $WC_N$) in a neural network (e.g., primary layer 104 or secondary layer 106 of FIGS. 1A-1B), according to some implementations. In some implementations, a series of WCs are interconnected to form a neural network similar to how software neurons form a software-based conventional neural network. The WCs are interconnected based on a neural network topology, according to some implementations. A neural network topology represents the way in which neurons are connected to form a network. The neural network topology can also be seen as the relationship between the neurons by means of their connections. The WCs may each operate on the same input stimulus $I_{WC}$ (318) to produce a corresponding output.

In some implementations, each WC has a Window Voltage Range (WVR) where the WC will produce a first value if the input is within the WVR and produce a second value if the input is outside of the WVR. In some implementations, the WVR is the difference between the Low Reference Voltage and the High Reference Voltage. In some implementations each WC has a unique WVR. For example, in FIG. 3, the reference voltages for comparator $WC_1$ ($R_L^1$ 302 and $R_H^1$ 304), comparator $WC_2$ ($R_L^2$ 306 and $R_H^2$ 308), comparator $WC_3$ ($R_L^3$ 310 and $R_H^3$ 312), and comparator $WC_N$ ($R_L^N$ 314 and $R_H^N$ 316) are each set up such that the corresponding WVRs are all unique. In some implementations, the WVRs are non-overlapping. In some implementations, the WVRs are overlapping such that more than one WC responds to a given stimulus. For example, the output of more than one WCs (e.g., $O_{WC}^1$ 322, $O_{WC}^2$ 324, $O_{WC}^3$ 326, and $O_{WC}^N$ 328) could equal a high value (1) for a given input stimulus $I_{WC}$(318). The reference voltage inputs $R_L$ and $R_H$ of each WC are loaded with a voltage such that $R_H > R_L$ thereby creating a WVR for each WC. Each WC is initialized with a corresponding WVR at start-up, according to some implementations. In some implementations, each WC is initialized with a random WVR. In some other implementations, each WC is initialized with a WVR such that the WVRs form a uniform gradient over the entire neural network.

Figure 4:
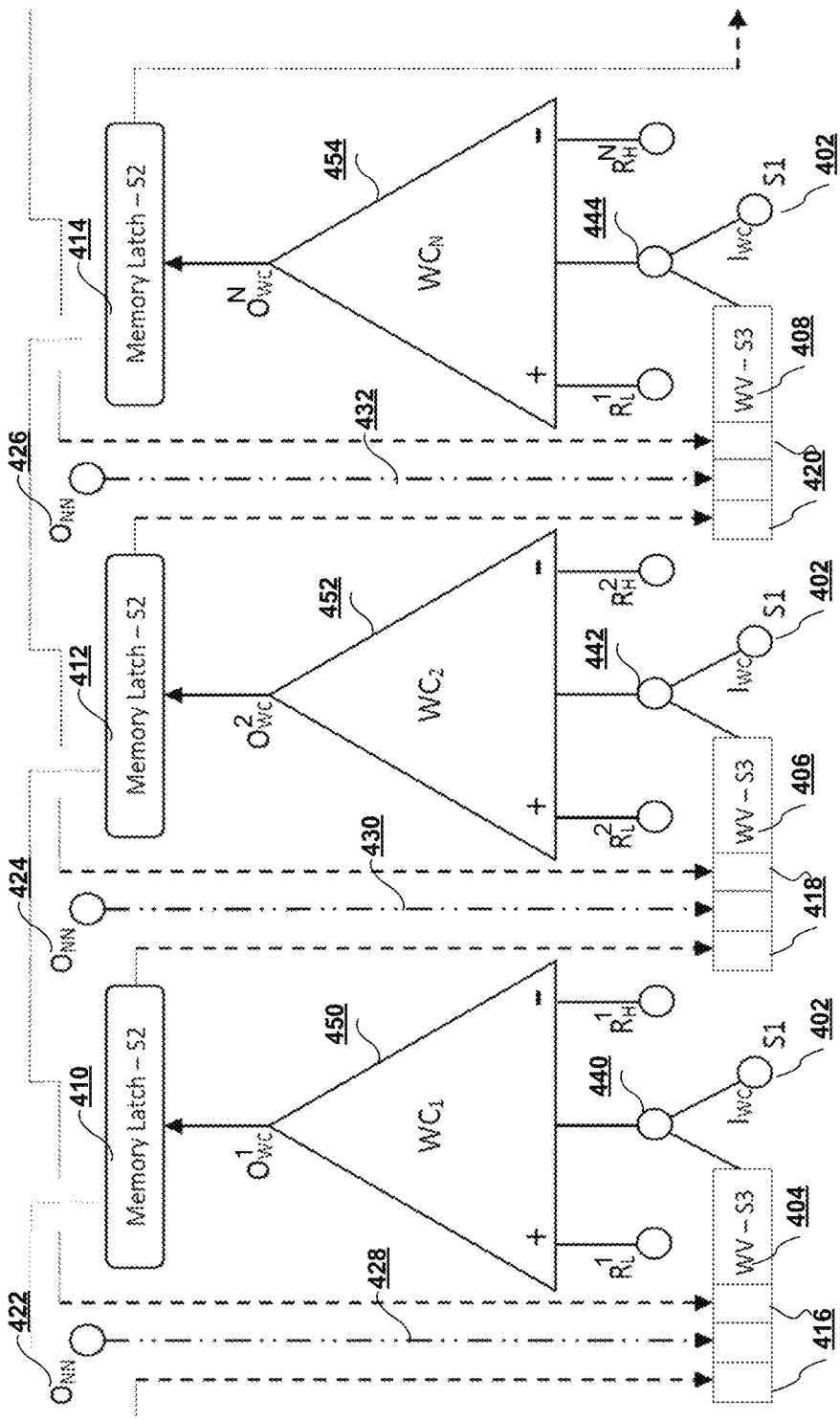
FIG. 4 illustrates a series of window comparators in an interconnected neural network with data flow control stages, according to some implementations.

FIG. 4 illustrates a series of WCs in an interconnected neural network (e.g., primary layer 104 or secondary layer 106 of FIGS. 1A-1B) with data flow control stages, according to some implementations. Primary stage (S1) is the data input stage or where the stimulus (e.g., input $I_{WC}$ 402) is input to the system. In some implementations, a Weight Voltage (WV) circuit is used to control input weights to the WC by introducing voltage in addition to the input data voltage $I_{WC}$. The Weight Voltages for different WCs (e.g., WV 404, WV 406, and WV 408) can be set to same or different voltage values in various implementations. In some implementations, a circuitry (which may be referred to herein as a weighted input module) is used to combine input stimulus with a weight voltage, and to supply net weighted input to a respective WC. For example, in FIG. 4, circuitry 440 combines a weight voltage from WC 404 with input stimulus $I_{WC}$ 402 to supply a weighted input to comparator $WC_1$ 450, circuitry 442 combines a weight voltage from WC 406 with input stimulus $I_{WC}$ 402 to supply a weighted input to comparator $WC_2$ 452, and circuitry 444 combines a weight voltage from WC 408 with input stimulus $I_{WC}$ 402 to supply a weighted input to comparator $WC_N$ 454. In some implementations, a sub-classifier includes a weighted input module coupled to a comparator module. For example, in FIG. 4, comparator $WC_1$ 450 is coupled to weighted input module 440, comparator $WC_2$ 452 is coupled to weighted input module 442, and comparator $WC_N$ 454 is coupled to weighted input module 444.

For some topologies, a secondary stage (S2) circuit of latches or temporary memory cells (sometimes herein called memory modules, e.g., latches 410, 412, and 414) store the output of the WCs ($O_{WC}$), according to some implementations. There are various latching techniques to store data using different sequences. For example, in a simplified sequence, the latches store response to one stimulus at a time for a specified time period. In more complex sequences, the input data is divided into data chunks and the latches store response data corresponding to one data chunk at a time.

In some implementations, the output ($O_{WC}$) data of a respective WC is input to the other WCs based on the topology or method of interconnectivity of the neural network, according to some implementations. In some implementations, another set of circuits in the neural network (e.g., circuits 416, 418, and 420), placed after the secondary stage (S2) memory latches feed voltage back into the neighbor neurons (WC) so as to adjust the WV of input stage of the WCs in stage 3 (S3), as shown in FIG. 4. In some implementations, additional connections (e.g., connections 428, 430, and 432) from one or more neurons in the neural network is applied to the WV circuit as indicated by the topology bus $O_{NN}$ (e.g., topology bus 422, 424, or 426). In some implementations, without a secondary stage (S2) circuit of latches, the clock cycle for activation of neurons or the pulse width may be set so that the current feedback does not saturate the network of neurons, and the neurons turn on only based on the output of the neurons.

Although the topology buses (e.g., buses 422, 424, and 426) are identified by the same name $O_{NN}$ in FIG. 4, in various implementations, the topology buses are configured differently; for example, different portions or regions of a neural network can be organized or interconnected differently based on a local topology. Similar to how the human brain is divided into highly specialized regions, in some implementations, a single wafer of silicon (with millions or even billions of WCs) can be further subdivided into regions of neural networks, with individual topologies specialized for specific functions (such as speech, vision, hearing, etc.) that are themselves interconnected to form an artificial brain.

Due to the type of circuitry and hardware connectivity, all the WCs can be processed simultaneously in a parallel computing fashion yielding significant performance gains while also providing broad application as compared to fully software-based networks. For example, with one million WCs etched on a semiconductor wafer, the entire set of one million or more WCs can be evaluated in a single clock cycle. Assuming the clock frequency is 2 GHz, for example, two billion or more iterations of the neural network of one million or more neurons (WCs) can be evaluated in one second.

To further illustrate how a network of WCs described above in reference to FIGS. 2-4 is used to build a neural network, consider an example construction of a Self-Organizing Map (SOM), a type of unsupervised learning network, according to some implementations. The self-organizing process in a SOM consists of initialization, competition, cooperation, and adaptation. Initially, the weight vector of every neuron is initialized with small random values. In the case of WC hardware neurons, the weight voltages (WVs) are initialized to random values. The neurons compute their respective values of a discriminant function for each input pattern (e.g., all pixels in an image). The discriminant function generally employed in conventional virtual neurons is the squared Euclidean distance between the input vector and the interconnection weight vector for each neuron. For WC-based hardware neurons, a discriminant function can be the squared Euclidean distance between the input voltage and the weight voltages. The particular neuron with the smallest value of the discriminant function is considered to be the determinant neuron. For a WC-based hardware neural network, depending on the initial configuration of voltage thresholds, and associated weights, one or more WC neurons could be the determinant neuron in response to an input pattern. For simplicity, consider for example a single determinant neuron. The determinant neuron determines, based on a topology, the spatial location of a neighborhood of activated neurons that cooperate (for e.g., to adjust weights in the neighborhood). When one neuron activates, its closest neighbors tend to have a more impacted response than those neighbors located further away. In a WC-based hardware neural network, because the voltage output from the determinant neuron is connected to its neighbors, the output affects the weight voltages of the neighbors. The impacted neurons update their individual values of the discriminant function in relation to the input pattern through an adjustment of the associated connection weights. In a WC-based neural network, the weights are continuously adapted. The response of the determinant neuron to the subsequent application of a similar input pattern is thus enhanced.

As a way to visualize the self-organizing process of a WC-based neural network, consider how a set of data input in a continuous two-dimensional input space is mapped onto a set of WC-based neurons. The WC-based neurons are organized or connected according to a topology (e.g., every neuron is connected to every other neuron). The WC-based neurons may start at random assignments (e.g., voltage values) and the weights are initialized to random initial values or according to a gradation. Each of the neurons read a first input which is converted to a corresponding voltage value (by e.g., a pre-processor). One of the neurons, a "determinant neuron", will respond with a high value output. In various configurations, more than one neuron could respond to the input. The determinant neuron is said to move towards the data input because the initial value of the weights of the determinant neuron are adjusted, in response to the input voltage, to have the determinant neuron and its neighbors respond to the input voltage. The neighboring neurons also move towards the data input, but by smaller amounts. Because all the neurons feed on the same input at each step to select one or more determinant neurons and/or associated neighbors, the process is parallel (i.e., the WC-based neurons operate in unison). The weights (voltage values for all the WC-based neurons) are adjusted at the end of this step. Next, a second data input is chosen for training. A different neuron than the first "determinant neuron" is determinant in this second round. And the neurons next to the new determinant neuron respond by moving towards the second data input by a smaller amount. The weights are adjusted again at the end of this step. The process continues until the weights of all the neurons reach a stable state (e.g., there are no longer large variations in the weight voltages of the neurons in the neural network), and at least until all the input data is processed. For example, the process is repeated several times using a given data set. In the end, the whole output grid of WC-based neurons represents the input space.

Figure 5:
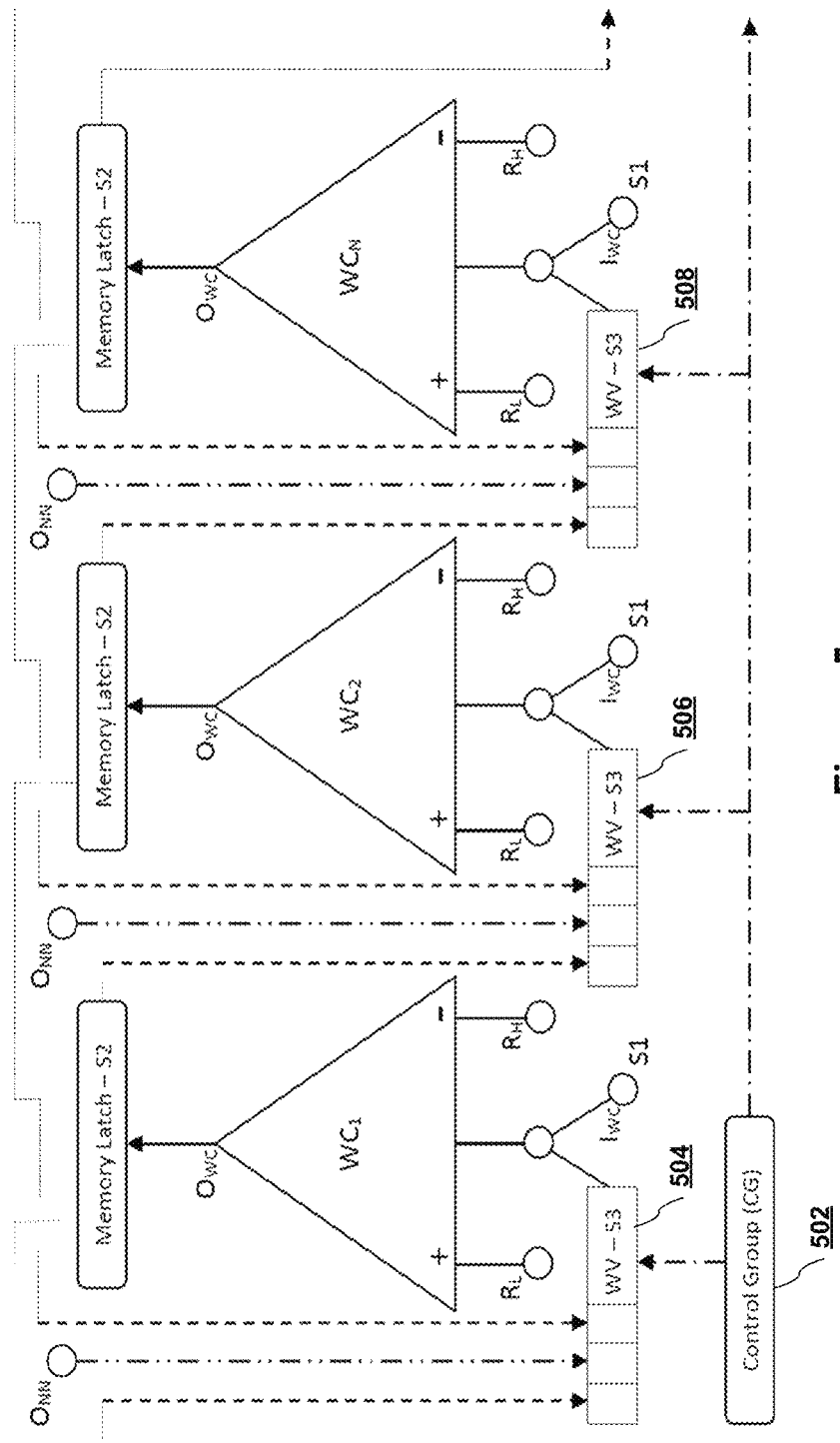
FIG. 5 illustrates the series of window comparators in FIG. 4 with an added control group (CG) to control neuroplasticity and behavior of the neural network, according to some implementations.

FIG. 5 illustrates a series of WCs (as in FIG. 4) with an added CG signal 502 from a CG module (not shown). The CG module controls neuroplasticity and behavior of the neural network, according to some implementations. With neuroplasticity, a neural network performs self-learning. Conventional networks are trained via repeated exposure to dataset and converge over a period of time, and the weights of the connections are adjusted to match the dataset to produce a meaningful output. The training period depends on the learning rate. As an example, for Self Organizing Maps (SOM), the training period also depends on the learning radius or the number of neurons called into the influence of training. The learning radius indicates the distance from a Best Matching Unit (BMU), the neuron that activates (sometimes herein called the "determinant neuron") for a particular input. These parameters are gradually reduced until the neural network is fully trained to respond to a stimulus in a desired way. However, any new dataset not accounted for during the initial training falls outside the purview of the trained neural network. This limits the ability of the neural network to achieve neuroplasticity, and the neural network must be retrained to handle new datasets or redesigned to accommodate new data.

To address these limitations with traditional neural networks, in some implementations, as shown in FIG. 5, CG signals (e.g., signal 502) either enhance or inhibit response to input stimulus, and modify the learning rate and/or the number of neurons. In some implementations, the CG signals are applied to the neural network continuously and/or intermittently so as to affect the behavior of the neural network. Such behavioral changes include how attentive, relaxed, and/or responsive the neural network is in response to a stimulus. In some implementations, the CG signals limit the focus of the neural network to specific stimulus, and/or the overall learning ability of the neural network. The CG signals thus implement adaptive learning even as the neural network processes a stimulus. In some implementations, more than one CG variable is used contemporaneously, covering complex behavioral patterns. In some implementations, the CG signals can influence local behavior/plasticity and/or global behavior/plasticity of a group of WC neurons. In some implementations, the CG signal may influence the sensitivity of the comparison module. In some implementations, the CG signal may influence the input signal prior to the weighting module. In FIG. 5, for example, the CG signal 502 affects the input to neurons or comparators $WC_1$, $WC_2$, and $WC_N$. In some implementations, different CG signals are applied to different regions or neighborhoods of WC neurons to impact the neural network behavior.

The WV circuitry (e.g., WV 504, WV 506, WV 508) receives a CG signal (e.g., signal 502) and adjusts the weighted input to the respective WCs based on the CG signal, according to some implementations. In various implementations, the WV circuitry is constructed using voltage control resistors (VCR) and/or variable resistors (e.g., a potentiometer or digital potentiometer, field effect transistor, resistor ladder, resistor bridge, resistor network, junction transistor, or other current or voltage control circuitry) that, depending on the CG signal, control the weighted output compared with an input stimulus by a WC.

Figure 6:
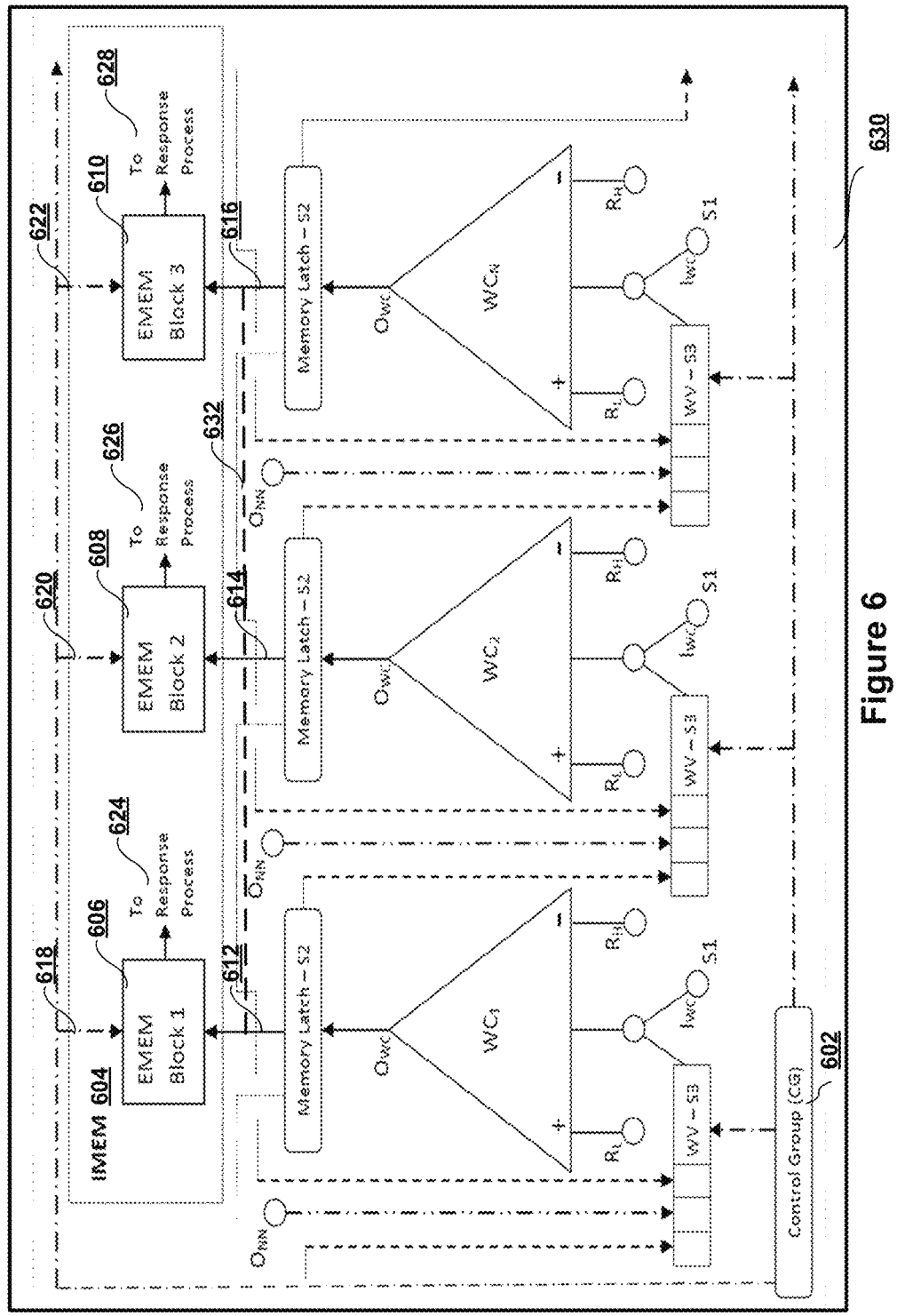
FIG. 6 illustrates the series of window comparators in FIG. 5 with an added implicit memory block addressable through the CG and the neural network, according to some implementations.

FIG. 6 illustrates a series of WCs with the CG signal of FIG. 5, and an additional memory 604 (also referred to herein as Implicit Memory (IMEM)), according to some implementations. IMEM 604 may permit fast redirection of memory pointers to sub-regions, and/or provides memory addresses for memory regions that contain data necessary for responding to stimulus. With IMEM 604, the evaluation system 116 (of FIGS. 1A-1B) avoids reading a large memory space to search for data specific to a given input stimulus in order to evaluate the specific data and provide a response 114.

Implicit memory can enhance a neural network to have intuitive responses to stimulus, for example by triggering a response even if the input stimulus only resembles (and does not exactly match) a previous experience, according to some implementations. In comparison to IMEM, explicit memory blocks (e.g., EMEM blocks 606, 608, and 610) can be configured to store exact data (for e.g., past responses for past input) to be retrieved in response to an input stimulus, according to some implementations. For example, the PNP AI processor 102 can match a current input to a previous input (e.g., an equivalent of a person having visited a room or seen a video or an image), can retrieve a previously-generated virtual image from EMEM, and compare it to current input to generate a matching response. More detailed data is accessible via EMEM, whereas IMEM stores and represents general patterns of information and concepts extracted from data.

In some implementations, memory 604 can be visualized as a set of one or more memory blocks, with each memory block representing data to be retrieved. A memory block can be referenced both as an IMEM block as well as an EMEM block, according to some implementations. In some implementations, IMEM is addressable using a combination of one or more WC outputs (e.g., output from a given block of neurons of the neural network), and/or the CG states. For example, in FIG. 6, IMEM 604 is addressable directly via control signal 602 (shown by the signals 618, 620 and 622 that connect with corresponding EMEM blocks 606, 608, and 610, respectively), and/or WC output 612, 614, and 616. In some such implementations, CG signals influence the size of the memory blocks, or the number of memory blocks accessed for responding to a stimulus. In contrast to IMEM blocks, EMEM blocks are addressed via the WC output. For example, the connecting lines (e.g., lines 612, 614, and 616) are used to address the EMEM blocks in FIG. 6, according to some implementations.

As indicated in FIG. 6, data from the different memory blocks (e.g., blocks 624, 626, and 628) are used by evaluation system 116 (shown in FIGS. 1A-1B) to respond to input stimulus (e.g., output to response processes 624, 626, and 628), according to some implementations.

Similar to how caches memory architectures improve memory access by storing previously and/or frequently used functions or data for quicker access, IMEM architecture improves memory access based on the familiarity of stimulus. For example, a stimulus that is repeatedly observed can provide feedback to the system such that one or more control group signals can be used to directly access one or more objects in memory, without having to rely on pattern matching the output of the neural network to specify memory locations. But, unlike caches, IMEM improves memory access (e.g., via the direct accesses using CG and WC output) without requiring extra storage or performing repetitive search iterations to parse and find the correct memory location.

Although FIG. 6 illustrates the EMEM blocks as if a respective EMEM block is connected to only a single sub-classifier (e.g., the line 612 connecting the first sub-classifier to EMEM Block 1), the sub-classifiers can access more than one EMEM block. The connecting lines (e.g., lines 612, 614, and 616) are intended to show the addressability of the EMEM blocks via the output of the comparators.

As indicated by the block 630, in some implementations, a master classifier comprises a plurality of sub-classifiers, IMEM blocks, and/or CG signals. In some implementations, a master classifier 630 is an independent module (not shown in FIG. 6) coupled to a plurality of sub-classifiers, IMEM blocks, and/or CG signals. In some such implementations, the master classifier 630 receives each of the respective output signals from each of the plurality of sub-classifiers (e.g., via memory 604) during the one or more clock cycles, and determines a classifier response based on the subset of the plurality of sub-classifiers that produce a respective output signal having a value greater than a predetermined output threshold.

Figure 7:
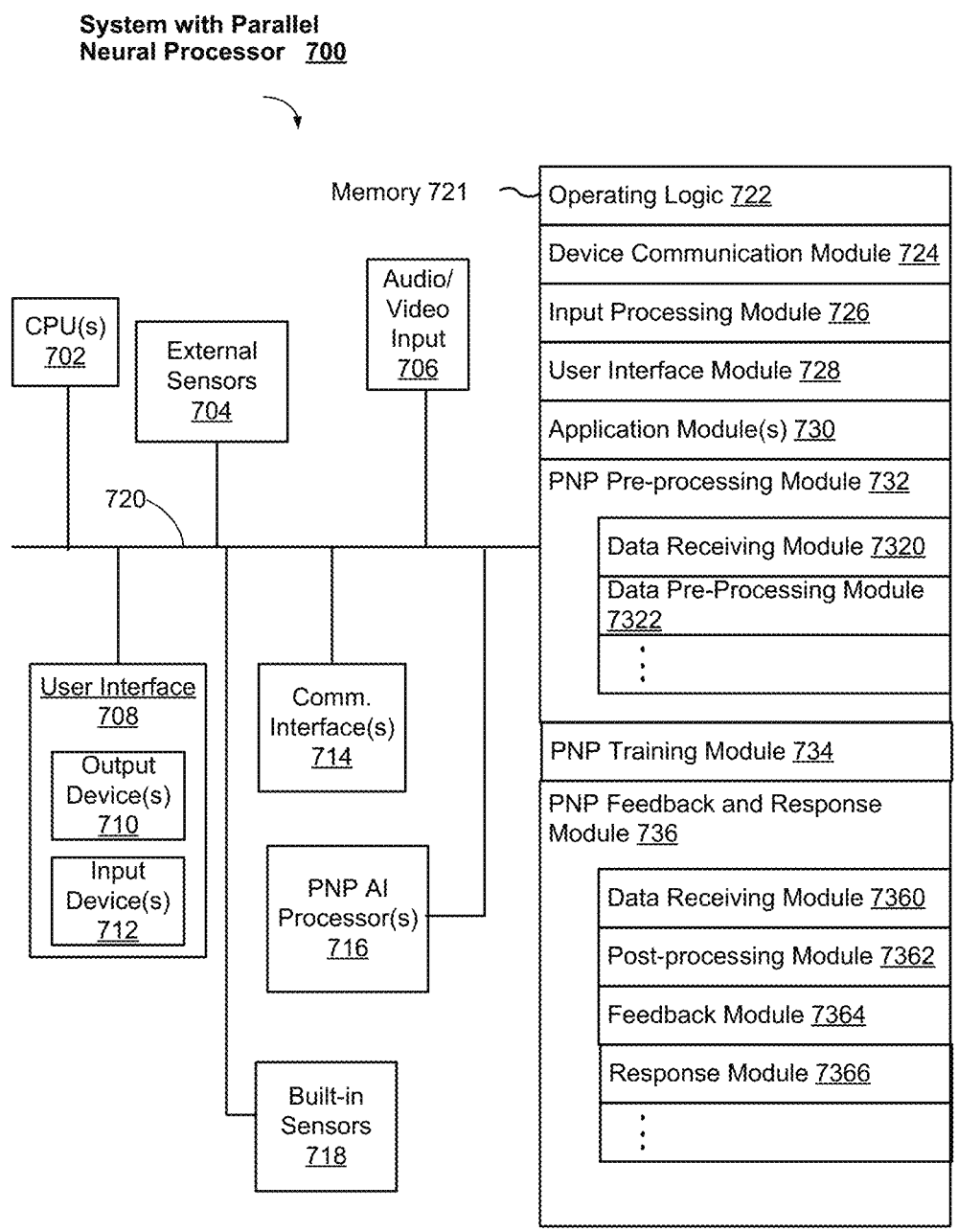
FIG. 7 is a block diagram illustrating a representative system 700 with a parallel neural processor of FIG. 1A or 1B, according to some implementations.

FIG. 7 is a block diagram illustrating a representative system 700 with a parallel neural processor (e.g., PNP AI processor 102), according to some implementations. In some implementations, the system 700 (e.g., any device with system architecture 100, FIG. 1A) includes one or more processing units (e.g., CPUs, ASICs, FPGAs, microprocessors, and the like) 702, one or more communication interfaces 714, memory 718, external sensors 704, audio/video input 706, and one or more communication buses 720 for interconnecting these components (sometimes called a chipset).

In some implementations, the system 700 includes a user interface 708. In some implementations, the user interface 708 includes one or more output devices 710 that enable presentation of media content, including one or more speakers and/or one or more visual displays. In some implementations, user interface 708 also includes one or more input devices 712, including user interface components that facilitate user input such as a keyboard, a mouse, a voice-command input unit or microphone, a touch screen display, a touch-sensitive input pad, a gesture capturing camera, or other input buttons or controls. Furthermore, some systems use a microphone and voice recognition or a camera and gesture recognition to supplement or replace the keyboard.

In some implementations, the system 700 includes one or more image/video capture or audio/video input devices 706 (e.g., cameras, video cameras, scanners, photo sensor units). Optionally, the system 700 includes a location detection device (not shown) for determining the location of the system device 700.

In some implementations, the system 700 includes one or more built-in sensors 718. In some implementations, the built-in sensors 718 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

In some implementations, the system 700 includes one or more external sensors 704. In some implementations, the external sensors 704 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The system 700 includes one or more parallel neural processors 716 for performing/offloading AI tasks (e.g., PNP AI processors 102 in FIG. 1A or 1B) described above in reference to FIGS. 1-6, according to some implementations.

Communication interfaces 720 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, Wireless HART, MiWi, etc.) and/or any of a variety of custom or standard wired protocols (e.g., Ethernet, Home Plug, etc.), or any other suitable communication protocol, including communication protocols not yet developed as of the filing date of this document.

Memory 721 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 721, or alternatively the non-volatile memory within memory 721, includes a non-transitory computer readable storage medium. In some implementations, memory 721, or the non-transitory computer readable storage medium of memory 721, stores the following programs, modules, and data structures, or a subset or superset thereof:
  operating logic 722 including procedures for handling various basic system services and for performing hardware dependent tasks;
  device communication module 724 for connecting to and communicating with other network devices (e.g., network interface, such as a router that provides Internet connectivity, networked storage devices, network routing devices, server system, etc.) connected to one or more networks via one or more communication interfaces 720 (wired or wireless);
  input processing module 726 for detecting one or more user inputs or interactions from the one or more input devices 712 and interpreting the detected inputs or interactions;
  user interface module 728 for providing and displaying a user interface in which settings, captured data, and/or other data for one or more devices (not shown) can be configured and/or viewed;
  one or more application modules 730 for execution by the system 700 for controlling devices, and for reviewing data captured by devices (e.g., device status and settings, captured data, or other information regarding the system 700 and/or other client/electronic devices);
  PNP pre-processing module 732, which provides functionalities for pre-processing data for PNP AI processor (s) 716, including but not limited to:
    data receiving module 7320 for receiving data from one or more input devices 712, external sensors 704, built-in sensors 718, and/or audio/video input 706 that is to be processed by the PNP AI processor(s) 716;
    data pre-processing module 7322 for processing data captured or received by the data receiving module 7320, and for preparing (e.g., for creating set of vectors from raw data input, organizing the vectors into a table, and/or converting raw data into voltage values), and for sending processed data (e.g., loading data by applying current) to the PNP AI processor(s) 716;
  PNP training module 734 that co-ordinates with the PNP pre-processing module 732 and/or PNP feedback and response module 734 (described below) to train the one or more PNP AI processor(s) 716 (e.g., setting up the voltage values/thresholds, initializing the neural network(s), and monitoring the learning rate and progress); and
  PNP feedback and response module 734, including but not limited to:
    data receiving module 7360 for receiving data from the PNP AI processor(s) 716 (e.g., for receiving voltage values from the output of window comparator circuits);
    data post-processing module 7362 for post-processing data received from the PNP AI processor(s) 716 (e.g., for converting voltage values or neural network output to another format useful for further processing by the system);
    feedback module 7364 for generating feedback to the PNP AI processor(s) 716 based on its output (for e.g., to readjust control values), or based on input from other devices in the system (including changing environment); and
    response module 7366 for generating system response based on output of the PNP AI processor(s) (e.g., moving a robotic arm, changing the position of a camera, or signaling an alarm).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, memory 606, optionally, stores a subset of the modules and data structures identified above. Furthermore, memory 606, optionally, stores additional modules and data structures not described above.

FIGS. 8A-8D illustrate a flowchart representation of a method 800 of processing input signals (802) using a sub-classifier that includes a weighted input module and a comparison module coupled to the weighted input module, according to some implementations. Sub-classifiers were described above in reference to FIG. 4. In some implementations, the comparison module includes (804) at least one operational amplifier module (for e.g., analog WC described above in reference to FIGS. 2A and 2B). The first sub-classifier applies (806), at the weighted input module, a weighting to the input signal to generated a weighted input signal. For example, in FIG. 4, weighted input module 440 applies weighting 404 to input signal 402 to generate a weighted input signal to comparator $WC_1$ 450. In some implementations, the weighted input module receives (808) a second output signal from a second sub-classifier. For example, in FIG. 4, weighted input module 442 receives output signals 418 from other sub-classifiers (e.g., from sub-classifier output from memory latch 410).

The method 800 further includes receiving (810), at the comparison module, the weighted input signal at a comparison module input line. For example, in FIG. 4, comparator $WC_1$ 450 receives weighted input signal from weighted input module 440 on the line shown connecting module 440 with comparator 450. In some implementations, the comparison module includes at least one operational amplifier module (described above in reference to 804), and receiving the weighted input signal comprises receiving (812), at the at least one operational amplifier module, the weighted input signal.

Figure 8A:
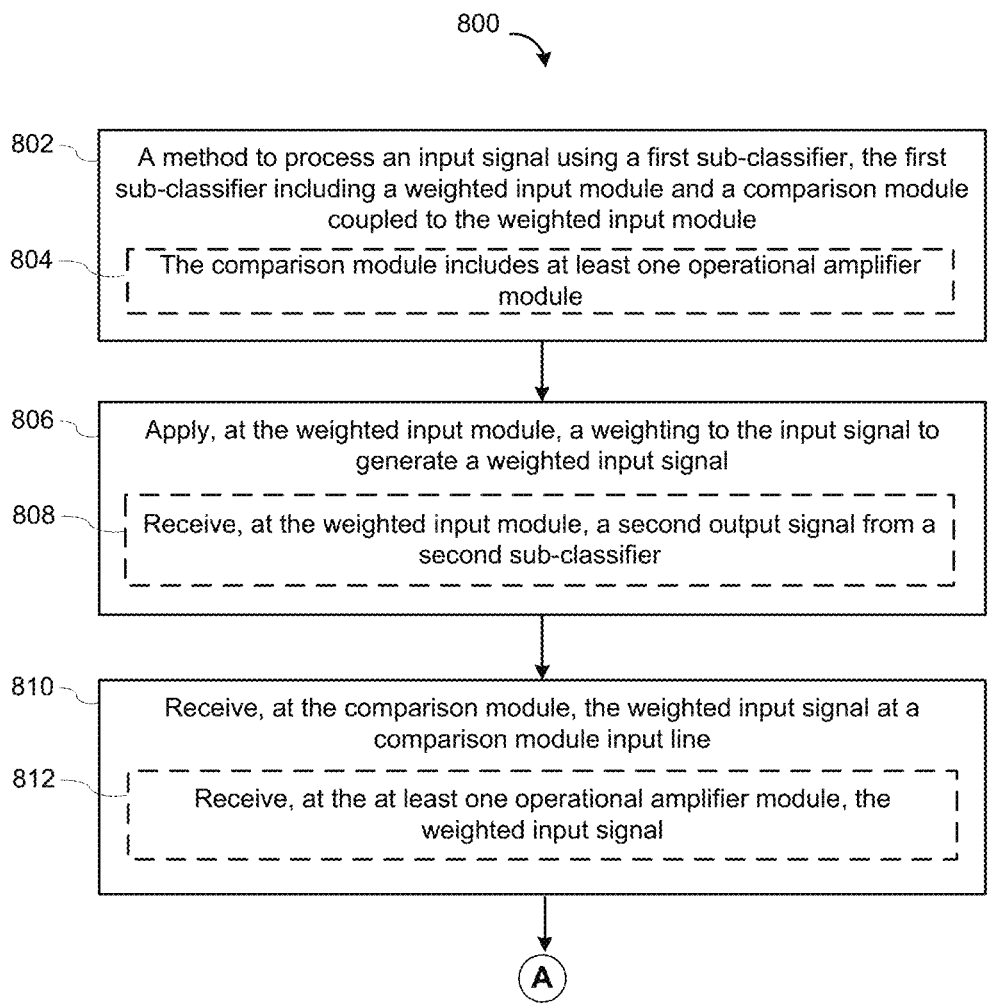
FIGS. 8A-8D illustrate a flowchart representation of a method of processing input signals using a sub-classifier that includes a weighted input module and a comparison module coupled to the weighted input module, according to some implementations.
Figure 8B:
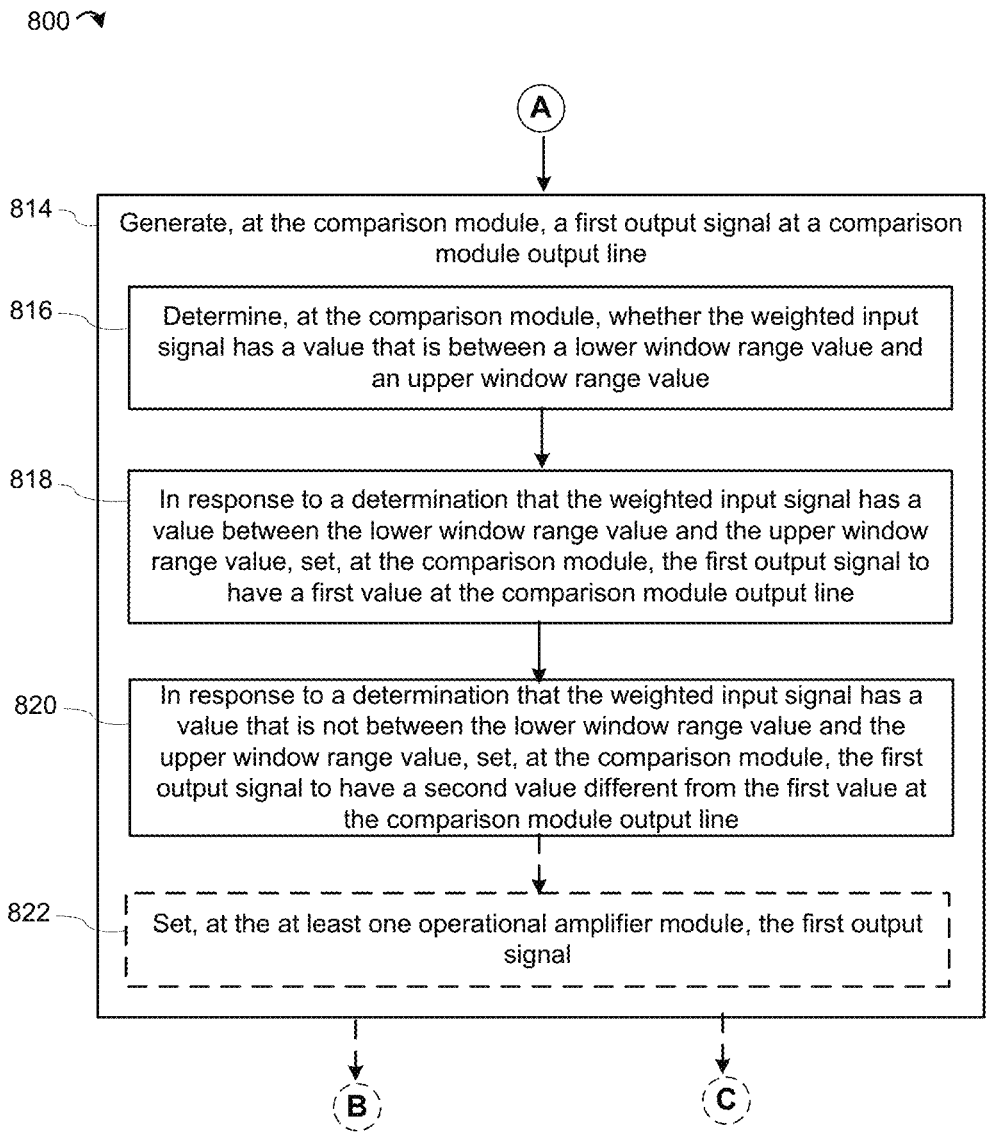

As shown the FIG. 8B, the method 800 further includes generating (814), at the comparison module, a first output signal at a comparison module output line, according to some implementations. For example, in FIG. 4, comparator $WC_1$ 450 generates output signal $O^1_{WC}$ on the line connecting the comparator $WC_1$ 450 with the memory latch 410. Generating the first output signal (814) comprises determining (816), at the comparison module, whether the weighted input signal has a value that is between a lower window range value and an upper window range value. Comparison operation was described above in reference to FIGS. 2A, 2B, 3, and 4, according to some implementations. For example, in FIG. 2A, Op-Amp 202 and Op-Amp 204 determine if the input voltage $I_{WC}$ 206 is between lower voltage threshold $R_L$ 208 and upper voltage threshold $R_H$ 210. Generating the first output signal (814) further comprises in response to a determination that the weighted input signal has a value between the lower window range value and the upper window range value, setting (818), at the comparison module, the first output signal to have a first value at the comparison module output line. For example, in FIG. 2A, Op-Amp 204 sets output $O_{WC}$ if the input voltage $I_{WC}$ 206 is between lower voltage threshold $R_L$ 208 and upper voltage threshold $R_H$ 210. As another example, in FIG. 4, comparator $WC_1$ (450) sets output $O^1_{WC}$ (to a high voltage value) at the line connecting the comparator with the memory latch 410 if the input voltage $I_{WC}$ 402 is between lower voltage threshold $R_L^1$ and upper voltage threshold $R_H^1$. Generating the first output signal (814) further comprises in response to a determination that the weighted input signal has a value that is not between the lower window range value and the upper window range value, setting (820), at the comparison module, the first output signal to have a second value different from the first value at the comparison module output line. For example, in FIG. 2A, Op-Amp 202 sets output $/O_{WC}$ if the input voltage $I_{WC}$ 206 is not between lower voltage threshold $R_L$ 208 and upper voltage threshold $R_H$ 210. As another example, in FIG. 4, comparator $WC_1$ (450) sets output $O^1_{WC}$ (to a low voltage value) at the line connecting the comparator with the memory latch 410 if the input voltage $I_{WC}$ 402 is between lower voltage threshold $R_L^1$ and upper voltage threshold $R_H^1$. In some implementations, the comparison module comprises of at least one operational amplifier (e.g., as described in FIG. 2A), and generating the first output signal (814) further comprises setting (822), at the at least one operational amplifier module, the first output signal.

Figure 8C:
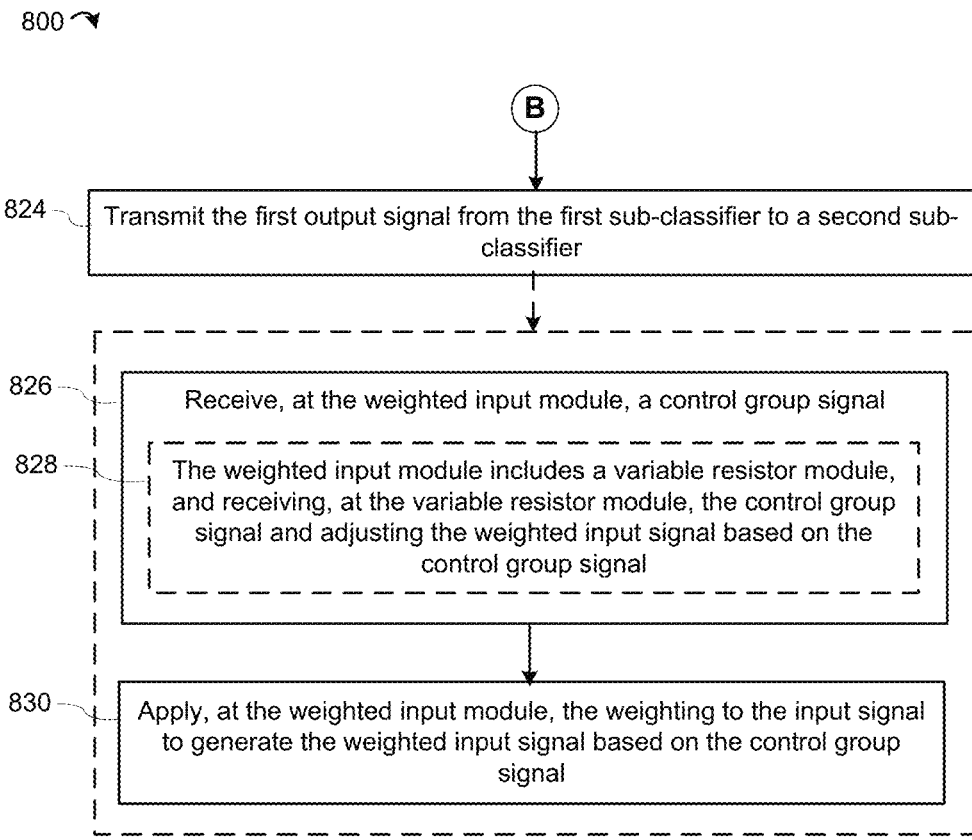

In some implementations, the method 800 further comprises, as shown in FIG. 8C, transmitting (824) the first output signal from the first sub-classifier to a second sub-classifier. For example, in FIG. 4, output signal from comparator $WC_1$ 450 latched in memory latch 410 is transmitted (shown as a dashed line, input 418) to a second sub-classifier that includes the comparator $WC_2$ 452 and the weighted input module 442.

In some implementations, the method 800 further includes receiving (826), at the weighted input module, a control group signal. In some such implementations, the weighted input module includes a variable resistor module, and the method includes receiving (828), at the variable resistor module, the control group signal and adjusting the weighted input signal based on the control group signal. In some implementations, the method 800 further includes applying (830), at the weighted input module, the weighting to the input signal to generate the weighted input signal based on the control group signal. Receiving and processing control group signals were explained above in reference to FIG. 5. For example, in FIG. 5, control group signal 502 is applied and adjust the weight values in the circuitries 504, 506, 508 before consumed by the corresponding weighted input modules.

Figure 8D:
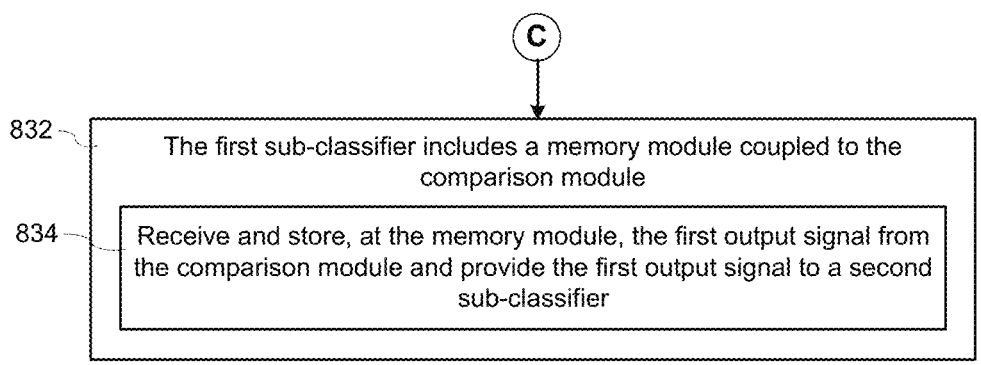

In some implementations, as shown in FIG. 8D, the first sub-classifier includes (832) a memory module coupled to the comparison module. In some implementations, the memory latch, the comparator, and the weighted input module comprise a sub-classifier. In some such implementations, the first sub-classifier receives, and stores (834), at the memory module, the first output signal from the comparison module and provides the first output signal to a second sub-classifier. For example, in FIG. 4, memory latch 410 is coupled to the comparator $WC_1$ (450), memory latch 412 is coupled to the comparator $WC_2$ (452), and memory latch 414 is coupled to the comparator $WC_N$ (454), according to some implementations.

FIGS. 9A-9E illustrate a flowchart representation of a method 900 of processing one or more input signals during one or more clock cycles using a classifier system. The classifier system includes (902) a plurality of sub-classifiers and a master classifier coupled to the plurality of sub-classifiers, the plurality of sub-classifiers each including a weighted input module and a comparison module, according to some implementations. Example master classifier coupled to a plurality of sub-classifiers was discussed above in reference to FIG. 6. In some implementations of the method 900, as shown in 920, FIG. 9B, each of the sub-classifiers has a respective window range between the lower window range value and the upper window range value that does not overlap with any other respective window range of any other sub-classifier. For example, in FIG. 3, the reference voltages for comparator $WC_1$ ($R_L^1$ 302 and $R_H^1$ 304), comparator $WC_2$ ($R_L^2$ 306 and $R_H^2$ 308), comparator $WC_3$ ($R_L^3$ 310 and $R_H^3$ 312), and comparator $WC_N$ ($R_L^N$ 314 and $R_H^N$ 316) are each set up such that the corresponding WVRs are all unique. In some implementations, the WVRs are non-overlapping. In some implementations of the method 900, as shown in 922, FIG. 9C, the classifier system includes a multiplexer module coupled to the plurality of sub-classifiers. In some such implementations, the method 900 includes providing (924), at the multiplexer module, one of the input signals to the plurality of sub-classifiers during a single clock cycle. Examples of multiplexer and/or pre-processing modules was described above in reference to FIG. 1A.

In some implementations, the method 900 includes (906), at each sub-classifier, applying (908), at the weighted input module, a weighting to a respective input signal for a respective clock cycle to generate a weighted input signal. In some such implementations, the method (900) further includes at each sub-classifier receiving (910), at the comparison module, the weighted input signal at a comparison module input line. In some such implementations, the method (900) further includes generating (912), at the comparison module, an output signal at a comparison module output line. An example weighted input module was described above in reference to FIG. 4, according to some implementations.

Figure 9A:
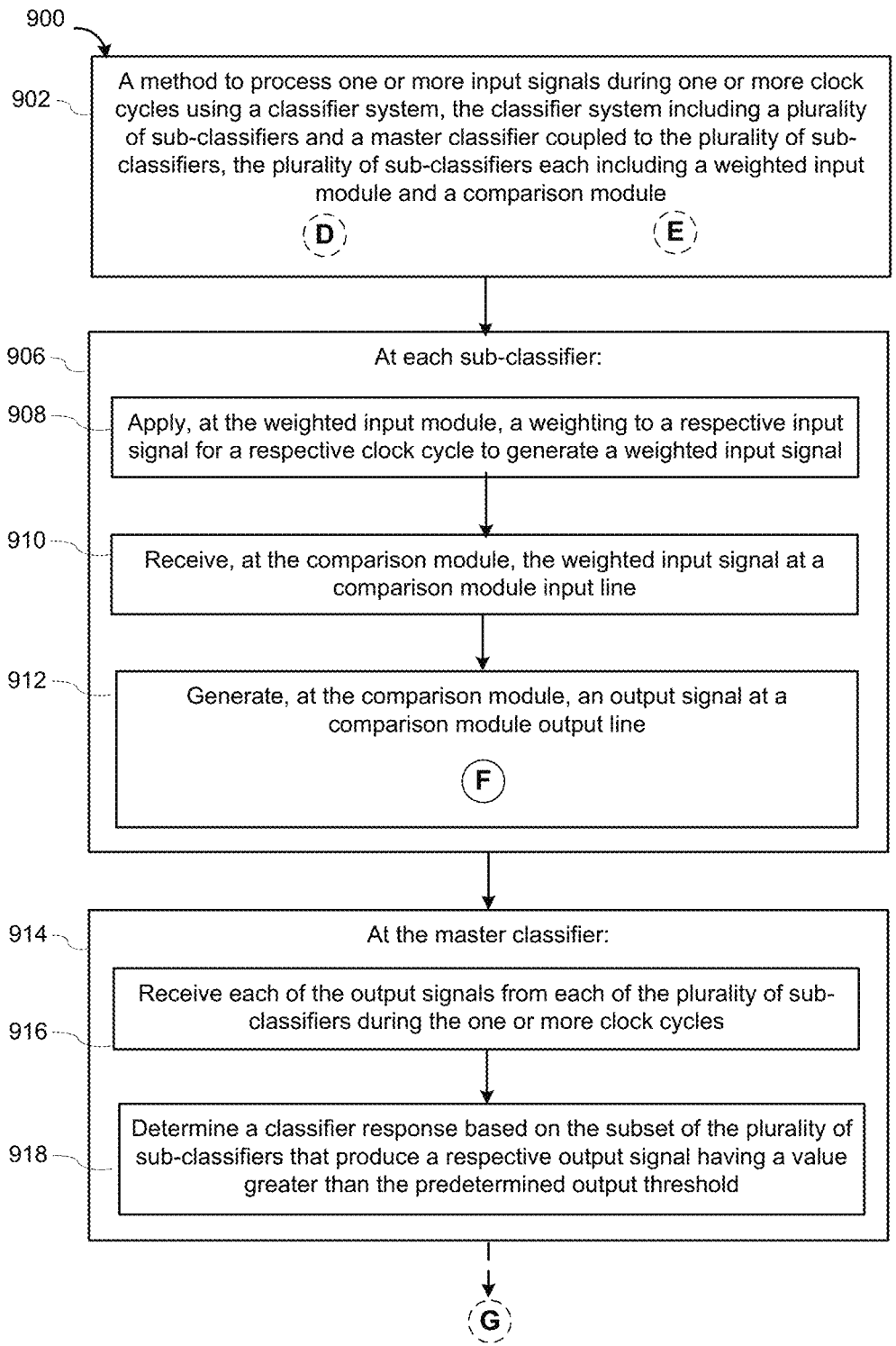
FIGS. 9A-9E illustrate a flowchart representation of a method of processing one or more input signals during one or more clock cycles using a classifier, the classifier including a plurality of sub-classifiers and a master classifier coupled to the plurality of sub-classifiers, the plurality of sub-classifiers each including a weighted input module and a comparison module, according to some implementations.
Figure 9B:
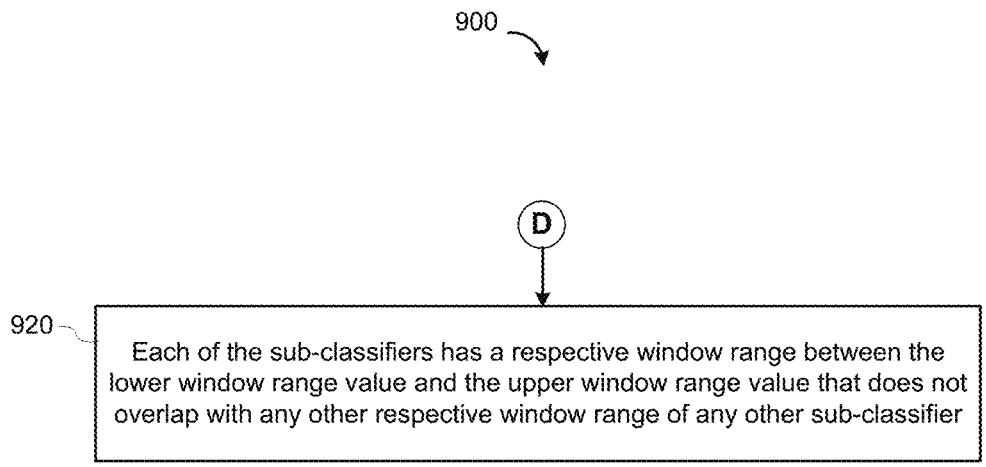
Figure 9C:
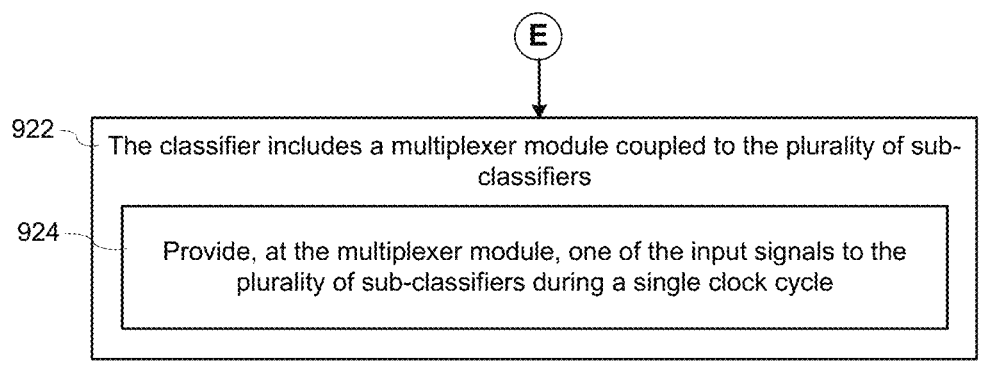
Figure 9D:
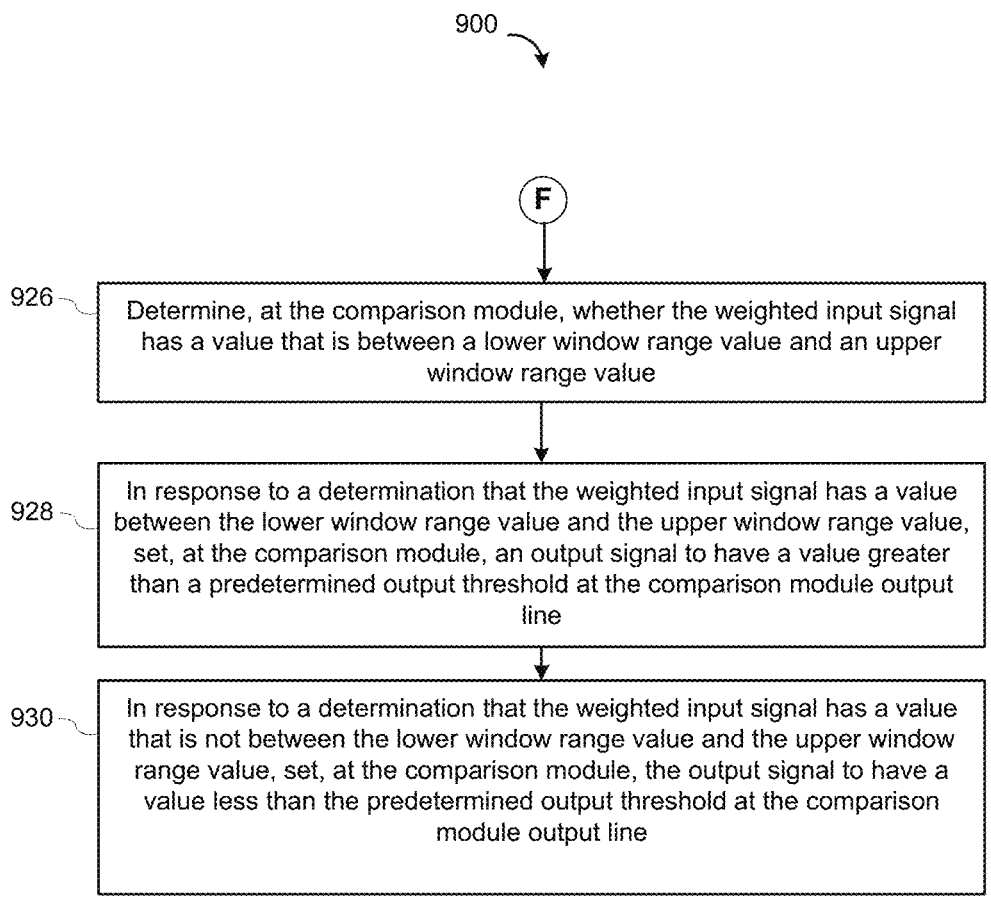
Figure 9E:
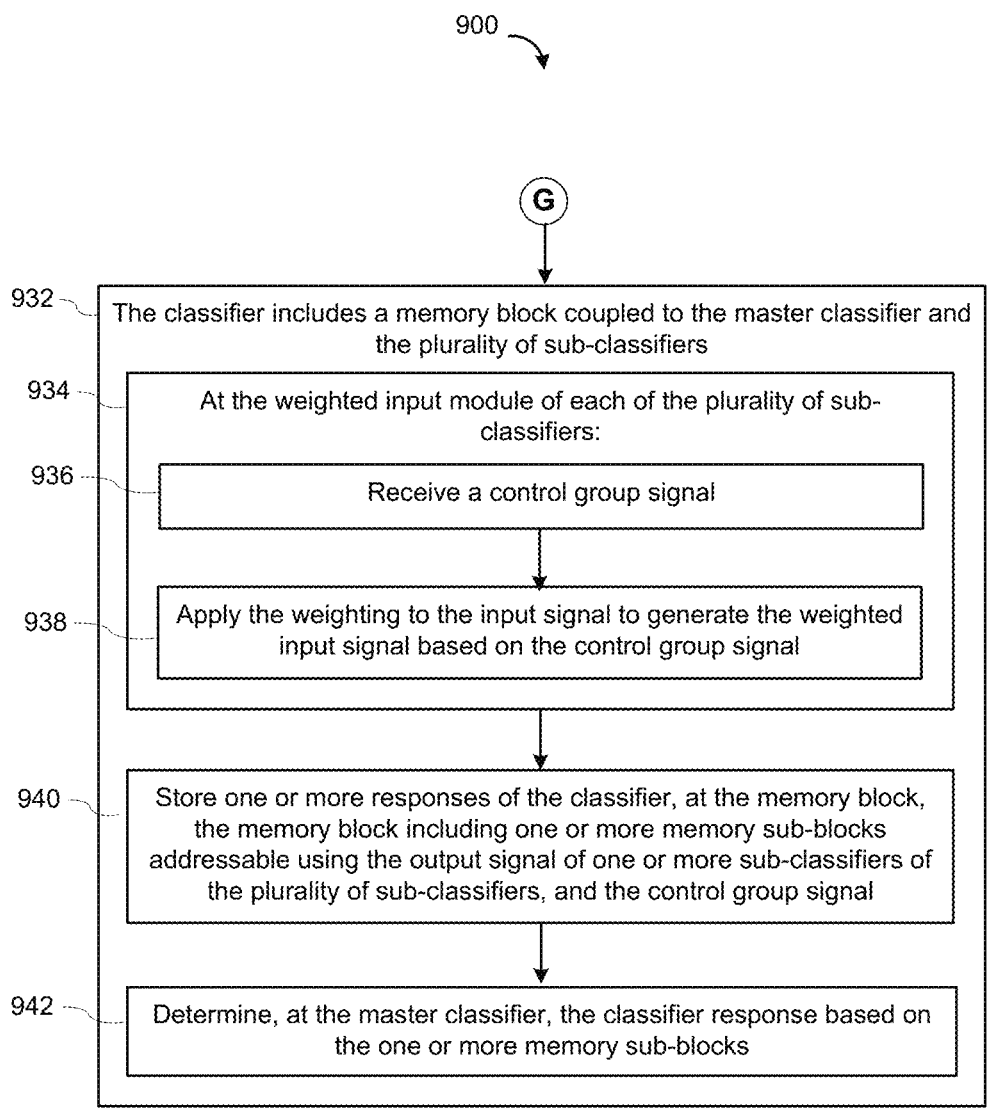

In some implementations, as shown in FIG. 9D, generating (912) an output signal at the comparison module comprises: determining (926), at the comparison module, whether the weighted input signal has a value that is between a lower window range value and an upper window range value; in response to a determination that the weighted input signal has a value between the lower window range value and the upper window range value, setting (928), at the comparison module, an output signal to have a value greater than a predetermined output threshold at the comparison module output line; and in response to a determination that the weighted input signal has a value that is not between the lower window range value and the upper window range value, setting (930), at the comparison module, the output signal to have a value less than the predetermined output threshold at the comparison module output line. Operations of the comparison module were described above in reference to FIG. 8B above and apply to the operations shown in FIG. 9D, according to some implementations.

Referring back to FIG. 9A, in some implementations, the method 900 includes (914) at the master classifier, receiving (916) each of the output signals from each of the plurality of sub-classifiers during the one or more clock cycles. In some such implementations, the method 900 further includes, at the master classifier, determining (918) a classifier response based on the subset of the plurality of sub-classifiers that produce a respective output signal having a value greater than the predetermined output threshold.

In some implementations of the method 900, the classifier includes (932) a memory block coupled to the master classifier and/or the plurality of sub-classifiers. In some such implementations, the method further comprises, at the weighted input module of each of the plurality of sub-classifiers (934): receiving (936) a control group signal, and applying (938) the weighting to the input signal to generate the weighted input signal based on the control group signal. The method further comprises storing (940) one or more responses of the classifier, at the memory block, the memory block including one or more memory sub-blocks addressable using the output signal of one or more sub-classifiers of the plurality of sub-classifiers, and the control group signal. The method further comprises determining (942), at the master classifier, the classifier response based on the one or more memory sub-blocks. Details of the master classifier were discussed above in reference to FIG. 6, according to some implementations. Further, as indicated in the discussions related to FIG. 6, the output of the EMEM blocks (e.g., output 624, 626, and 628) are used to determining the classifier response, according to some implementations.

It should be understood that the particular order in which the operations in FIGS. 8A-8D and 9A-9E have been described is merely an example and is not intended to indicate that the described order is the only order in which the operations could be performed. One of ordinary skill in the art would recognize various ways to reorder the operations described herein. Additionally, it should be noted that details of other processes described with respect to method 800 are also applicable in an analogous manner to the method 900 described above with respect to FIGS. 9A-9E.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A first sub-classifier configured to process an input signal, the first sub-classifier comprising:
   a weighted input circuit, the weighted input circuit configured to receive a control group signal and apply a weighting to the input signal to generate a weighted input signal based on the control group signal, wherein the control group signal controls responsiveness of a plurality of sub-classifiers including the first sub-classifier to the input signal, and wherein the plurality of sub-classifiers form a self-organizing map (SOM);
   a comparison circuit coupled to the weighted input circuit, the comparison circuit configured to:
      receive the weighted input signal at a comparison circuit input line; and
      generate a first output signal at a comparison circuit output line; the comparison circuit being further configured to:
         determine whether the weighted input signal has a value that is between a lower window range value and an upper window range value;
         in response to a determination that the weighted input signal has a value between the lower window range value and the upper window range value, set the first output signal to have a first value at the comparison circuit output line; and
         in response to a determination that the weighted input signal has a value that is not between the lower window range value and the upper window range value, set the first output signal to have a second value different from the first value at the comparison circuit output line.

2. The first sub-classifier of claim 1, wherein the comparison circuit includes at least one operational amplifier configured to receive the weighted input signal and set the first output signal.

3. The first sub-classifier of claim 1, wherein the weighting applied to the input signal to generate the weighted input signal is based on a second output signal from a second sub-classifier.

4. The first sub-classifier of claim 1, wherein the first output signal from the first sub-classifier is transmitted to a second sub-classifier.

5. The first sub-classifier of claim 1, wherein the weighted input circuit includes:
 a variable resistor or variable current or voltage regulator configured to receive the control group signal and adjust the weighted input signal based on the control group signal or influence the stimulus sensitivity of the comparison circuit.

6. The first sub-classifier of claim 1, further comprising:
 a memory circuit configured to receive and store the first output signal from the comparison circuit and provide the first output signal to a second sub-classifier.

7. A classifier system configured to process one or more input signals during one or more clock cycles, comprising:
 a plurality of sub-classifiers, each of the plurality of sub-classifiers including:
  a weighted input circuit, the weighted input circuit configured to receive a control group signal and apply a weighting to a respective input signal for a respective clock cycle to generate a weighted input signal based on the control group signal, wherein the control group signal controls responsiveness of the plurality of sub-classifiers, including the respective sub-classifier, to the respective input signal, and wherein the plurality of sub-classifiers form a self-organizing map (SOM);
  a comparison circuit coupled to the weighted input circuit, the comparison circuit configured to:
   receive the weighted input signal at a comparison circuit input line; and
   generate an output signal at a comparison circuit output line; the comparison circuit being further configured to:
    determine whether the weighted input signal has a value that is between a lower window range value and an upper window range value;
    in response to a determination that the weighted input signal has a value between the lower window range value and the upper window range value, set an first output signal to have a value greater than a predetermined output threshold at the comparison circuit output line; and
    in response to a determination that the weighted input signal has a value that is not between the lower window range value and the upper window range value, set the first output signal to have a value less than the predetermined output threshold at the comparison circuit output line;
 a memory circuit configured to receive and buffer the output signal generated by the respective comparison circuit of each of the plurality of sub-classifiers; and
 a master classifier coupled to the memory circuit, the master classifier configured to:
  receive, from the memory circuit, each of the respective output signals from each of the plurality of sub-classifiers buffered by the memory circuit during the one or more clock cycles, and
  determine a classifier response based on the subset of the plurality of sub-classifiers that produce a respective output signal having a value greater than the predetermined output threshold.

8. The classifier system of claim 7, wherein each of the sub-classifiers has a respective window range between the lower window range value and the upper window range value that does not overlap with any other respective window range of any other sub-classifier in the plurality of sub-classifiers.

9. The classifier system of claim 7, further comprising:
 a multiplexer coupled to the plurality of sub-classifiers, the multiplexer configured to provide one of the input signals to the plurality of sub-classifiers during a single clock cycle.

10. The classifier system of claim 7, further comprising:
 an implicit memory region configured to produce, based on output of the plurality of sub-classifiers, an implicit memory output representative of cluster patterns of information and/or concepts extracted from data; and
 an explicit memory region configured to produce, based on output of the plurality of sub-classifiers, an explicit memory output representative of prior classifier responses to respective input signals.

11. The classifier system of claim 10, further comprising:
 an evaluation system configured to:
  compare the implicit memory output to the explicit memory output;
  in response to determining that there is a mismatch between the implicit memory output and the explicit memory output, adjusting one or more characteristics of the control group signal transmitted to the plurality of sub-classifiers to modify the number of sub-classifiers used for subsequent processing.

12. The classifier system of claim 10, wherein
 the implicit memory region is configured to:
  receive an implicit memory address signal represented by one or more outputs of the plurality of sub-classifiers and the control group signal, and
  output an implicit memory output signal that corresponds to the received implicit memory address signal; and wherein
 the explicit memory region is configured to:
  receive an explicit memory address signal represented by one or more outputs of the plurality of sub-classifiers, without the control group signal, and
  output an implicit memory output signal that corresponds to the received implicit memory address signal.

13. A method to process an input signal using a first sub-classifier, the first sub-classifier including a weighted input circuit and a comparison circuit coupled to the weighted input circuit, the method comprising:
 receiving, at the weighted input circuit, a control group signal;
 applying, at the weighted input circuit, a weighting to the input signal to generate a weighted input signal based on the control group signal, wherein the control group signal controls responsiveness of a plurality of sub-classifiers, including the first sub-classifier, to the input signal, and the plurality of sub-classifiers form a self-organizing map (SOM);

receiving, at the comparison circuit, the weighted input signal at a comparison circuit input line;

generating, at the comparison circuit, a first output signal at a comparison circuit output line, including:

determining, at the comparison circuit, whether the weighted input signal has a value that is between a lower window range value and an upper window range value;

in response to a determination that the weighted input signal has a value between the lower window range value and the upper window range value, setting, at the comparison circuit, the first output signal to have a first value at the comparison circuit output line; and in response to a determination that the weighted input signal has a value that is not between the lower window range value and the upper window range value, setting, at the comparison circuit, the first output signal to have a second value different from the first value at the comparison circuit output line.

14. The method of claim 13, wherein the comparison circuit includes at least one operational amplifier circuit, the method further comprising:

receiving, at the at least one operational amplifier circuit, the weighted input signal and setting, at the at least one operational amplifier circuit, the first output signal.

15. The method of claim 13, further comprising:

receiving, at the weighted input circuit, a second output signal from a second sub-classifier.

16. The method of claim 13, further comprising:

transmitting the first output signal from the first sub-classifier to a second sub-classifier.

17. The method of claim 13, wherein the weighted input circuit includes a variable resistor circuit, the method further comprising:

receiving, at the variable resistor circuit, the control group signal and adjusting the weighted input signal based on the control group signal.

18. The method of claim 13, wherein the first sub-classifier includes a memory circuit coupled to the comparison circuit, the method further comprising:

receiving and storing, at the memory circuit, the first output signal from the comparison circuit and provide the first output signal to a second sub-classifier.

19. The classifier system of claim 7, wherein the control group signal includes (i) a first control group variable to control responsiveness of a first group of sub-classifiers of the plurality of sub-classifiers, and (ii) a second control group variable to control responsiveness of a second group of sub-classifiers of the plurality of sub-classifiers.

20. A method to process one or more input signals during one or more clock cycles using a classifier system, the classifier system including a plurality of sub-classifiers and a master classifier coupled to the plurality of sub-classifiers, the plurality of sub-classifiers each including a weighted input circuit and a comparison circuit, the method comprising:

at each sub-classifier:

receiving, at the weighted input circuit, a control group signal;

applying, at the weighted input circuit, a weighting to a respective input signal for a respective clock cycle to generate a weighted input signal based on the control group signal, wherein the control group signal controls responsiveness of the plurality of sub-classifiers, including the respective sub-classifier, to the respective input signal, and wherein the plurality of sub-classifiers form a self-organizing map (SOM);

receiving, at the comparison circuit, the weighted input signal at a comparison circuit input line; and generating, at the comparison circuit, an output signal at a comparison circuit output line, including:

determining, at the comparison circuit, whether the weighted input signal has a value that is between a lower window range value and an upper window range value;

in response to a determination that the weighted input signal has a value between the lower window range value and the upper window range value, setting, at the comparison circuit, an output signal to have a value greater than a predetermined output threshold at the comparison circuit output line; and in response to a determination that the weighted input signal has a value that is not between the lower window range value and the upper window range value, setting, at the comparison circuit, the output signal to have a value less than the predetermined output threshold at the comparison circuit output line; and at the master classifier:

receiving each of the output signals from each of the plurality of sub-classifiers during the one or more clock cycles, and determining a classifier response based on the subset of the plurality of sub-classifiers that produce a respective output signal having a value greater than the predetermined output threshold.

21. The method of claim 20, wherein each of the sub-classifiers has a respective window range between the lower window range value and the upper window range value that does not overlap with any other respective window range of any other sub-classifier in the plurality of sub-classifiers.

22. The method of claim 20, wherein the classifier system includes a multiplexer circuit coupled to the plurality of sub-classifiers, further comprising:

providing, at the multiplexer circuit, one of the input signals to the plurality of sub-classifiers during a single clock cycle.

* * * * *